`US010127758B2`

(12) United States Patent
Chirnomas

(10) Patent No.: US 10,127,758 B2
(45) Date of Patent: Nov. 13, 2018

(54) AUTOMATIC RETAIL SELLING DEVICE AND METHOD OF OPERATION THEREFORE

(76) Inventor: Munroe Chirnomas, Morris Township, NJ (US)

( * ) Notice: Subject to any disclaimer, the term of this patent is extended or adjusted under 35 U.S.C. 154(b) by 2649 days.

(21) Appl. No.: 12/743,339

(22) PCT Filed: Nov. 17, 2008

(86) PCT No.: PCT/US2008/083834
§ 371 (c)(1),
(2), (4) Date: May 17, 2010

(87) PCT Pub. No.: WO2009/065145
PCT Pub. Date: May 22, 2009

(65) Prior Publication Data
US 2018/0174394 A1    Jun. 21, 2018

Related U.S. Application Data

(60) Provisional application No. 60/988,428, filed on Nov. 15, 2007.

(51) Int. Cl.
| | | |
|---|---|---|
| G06K 15/00 | (2006.01) | |
| G06F 7/00 | (2006.01) | |
| G07F 17/10 | (2006.01) | |
| G06Q 50/28 | (2012.01) | |
| G07F 11/58 | (2006.01) | |

(52) U.S. Cl.
CPC ............ *G07F 17/10* (2013.01); *G06Q 50/28* (2013.01); *G07F 11/58* (2013.01)

(58) Field of Classification Search
CPC .................................. G06F 7/00; G06K 15/00
USPC ......................... 235/383; 705/213, 214, 216
See application file for complete search history.

(56) References Cited

U.S. PATENT DOCUMENTS

| | | | | |
|---|---|---|---|---|
| 2007/0270999 | A1* | 11/2007 | Chirnomas | G07F 17/10 700/221 |
| 2009/0149985 | A1* | 6/2009 | Chirnomas | B65G 1/1373 700/215 |
| 2010/0072221 | A1* | 3/2010 | Chirnomas | G07F 11/165 221/211 |

\* cited by examiner

Primary Examiner — Daniel Hess

(57) ABSTRACT

An automated device for automatically and without any human intervention, receiving into the device articles to be distributed or sold, storing the articles, and then distributing or selling the articles to users/customers. The store includes within a housing an entry means for controlling entry into the housing of a plurality of closed shipping containers. Also within the housing is an automated forming means for forming an opening in each of the plurality of the shipping containers, a storing means for storing the plurality of opened shipping containers inside a storage area of the housing, a computer controlled retrieving means for entering into selected ones of the opened shipping so as to retrieve an article from inside one of the stored opened shipping containers and further including moving means for moving the retrieved articles to an output of the housing. Such an automated device allows for new methods of operation of the automatic device, with respect to agreements between parties that distribute or sell articles to users or customers. Furthermore, such an automated device allows is particularly well suited for being implemented in a modular arrangement.

13 Claims, 16 Drawing Sheets

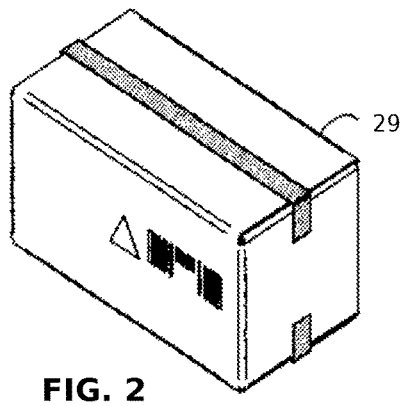
FIG. 2
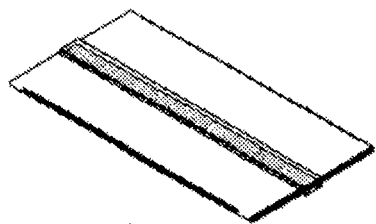
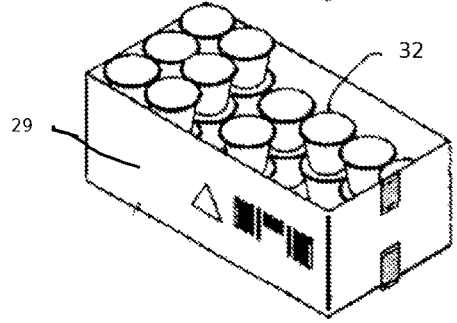
FIG. 3
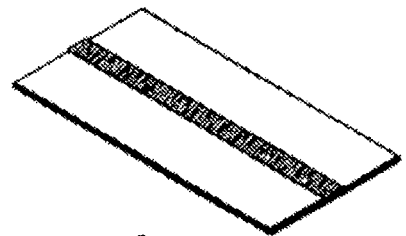
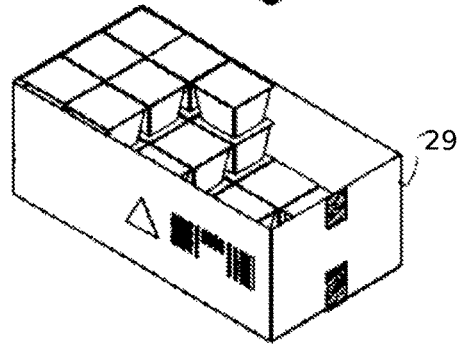
FIG. 4
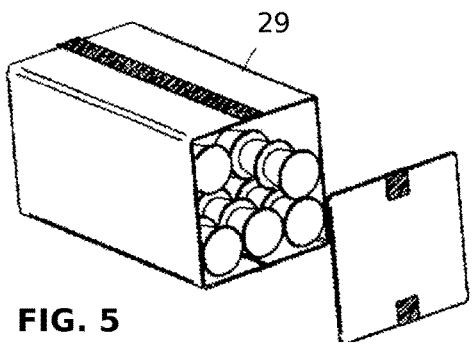
FIG. 5

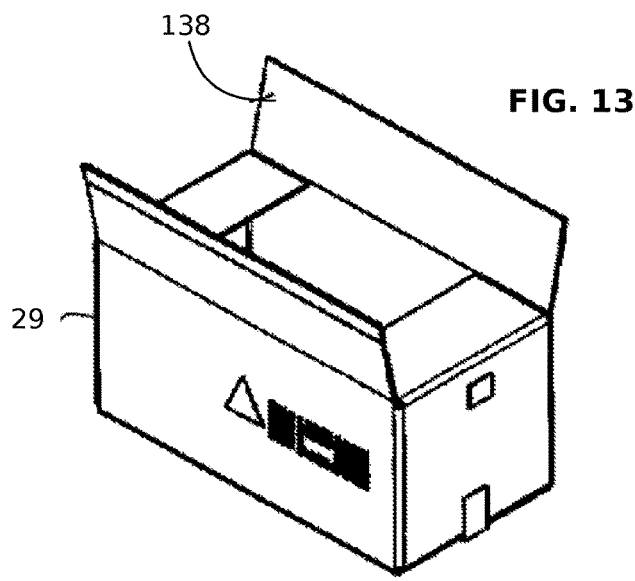
FIG. 13
FIG. 14
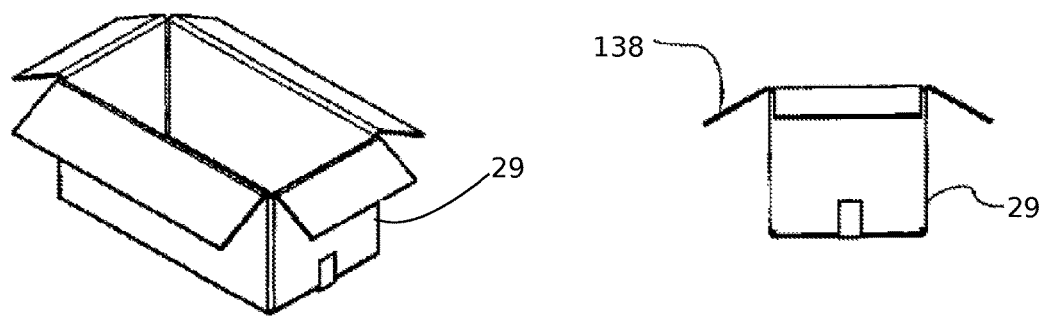

AUTOMATIC RETAIL SELLING DEVICE AND METHOD OF OPERATION THEREFORE

CROSS-REFERENCE TO RELATED APPLICATIONS

This application claims priority of and is a continuation application of PCT/US2007/010757, filed Nov. 29, 2007, entitled "Automated Store for Selling Articles" (which claims the benefit of U.S. Provisional Patent Application No. 60/988,428, filed Nov. 15, 2007, entitled "Automatic Storage and Distribution System and Method Of Operation Therefore". The entire disclosure of both of these patent applications is incorporated herein by reference.

FIELD OF THE INVENTION

The present invention relates generally to an automatic storage and distribution system and method of operation, and more particularly in one embodiment, to a modular automatic system for automatically receiving, opening and storing shipping containers and retrieving articles from the shipping containers and delivering them to a customer, as well as methods therefore.

DESCRIPTION OF THE DRAWINGS

FIG. 2 illustrates a typical shipping container of the type to be received and stored in the storage and distribution system of FIG. 1.

FIGS. 3-5 illustrate various openings formed in various shipping containers.

FIG. 13 illustrates a typical shipping container (sometimes called a "box" or "delivery carton" herein), which in one embodiment has its flaps opened up to facilitate forming an article retrieving opening in the box.

FIG. 14 shows two more views of the box with the flaps already in the position before flaps would be cut off.

DETAILED DESCRIPTION OF THE INVENTION

My prior filed PCT patent application PCT/US2007/010757, is incorporated herein by reference for US purposes, and generally describes an automated storage and distribution system, and more specifically configured as a retail store. FIGS. 1-10 herein comprise FIGS. 1-10 of my prior PCT application, and will now be more specifically described.

Figure 1:
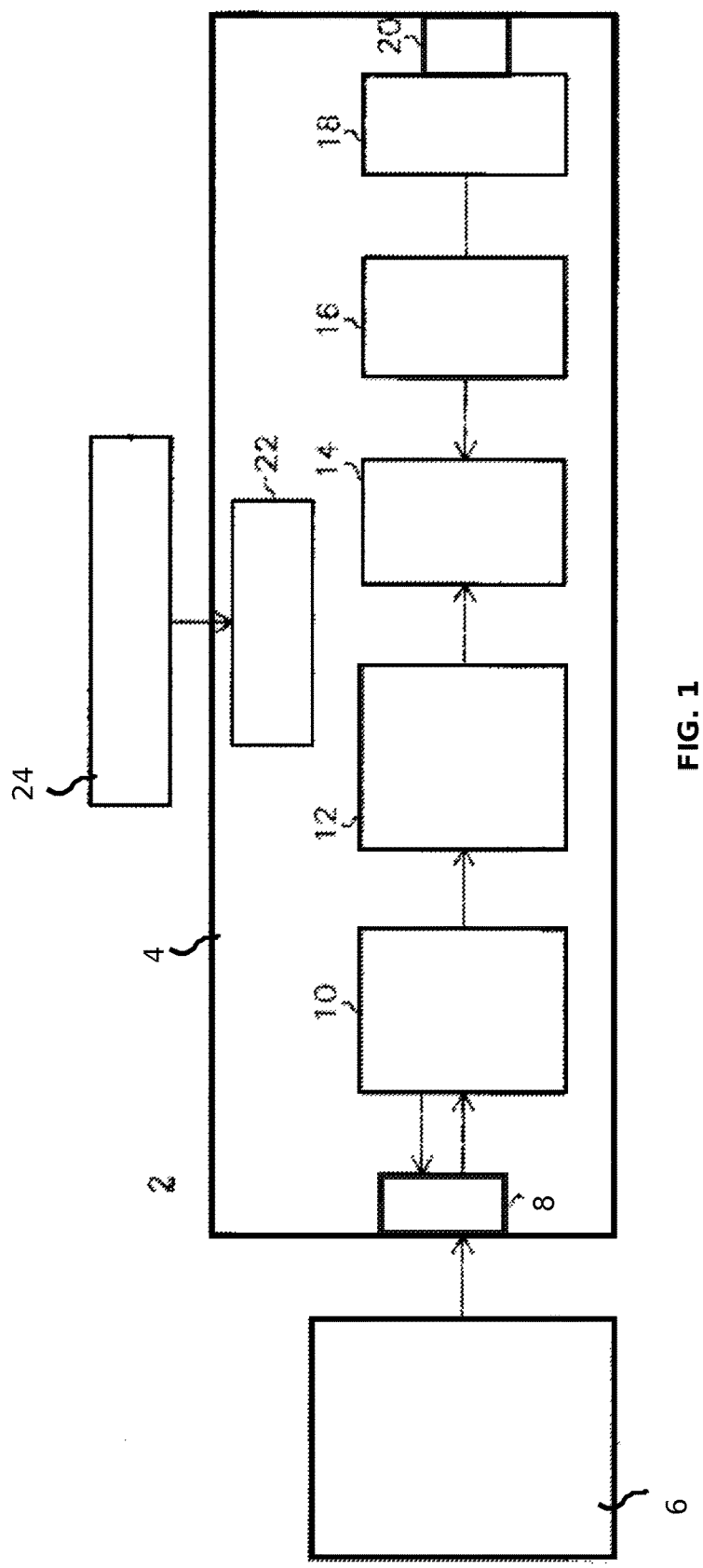
FIG. 1 illustrates one embodiment of an automated storage and distribution system in accordance with the invention.

FIG. 1 shows one embodiment of a system which is an automated store 2 for storing and selling articles. The automated store has a housing 4 for receiving closed shipping containers (29 of FIG. 2) into the housing for storage, and for distributing articles 32 of FIG. 3, to an output 20 of the housing which articles 32 were retrieved from inside stored shipping container 29.

In one embodiment, a store including an entry means 8 (secure portal/interlock area 80 of FIG. 8) for controlling entry into the housing 4 of a plurality of closed shipping containers 29, with at least some of the plurality of closed shipping containers having outer dimensions which are different from the outer dimensions of other ones of the plurality of closed shipping containers.

The embodiment shown in FIG. 1 also shows:

a sensing means 10 for determining the position of at least a portion of an outside surface of each one of the plurality of closed shipping containers that have entered into the housing, an automated forming means 12 (and 82 of FIG. 8) for using the determined position which is specific to each of the closed shipping containers to form an opening in each of the plurality of the shipping containers, a storing means 14 (and 86 of FIG. 8) for storing the plurality of opened shipping containers inside a storage area of the housing, a computer controlled retrieving means 16 (and 84 of FIG. 8 and 90, 92 of FIG. 9) for entering into selected ones of the opened shipping containers located in the storage area, by passing through the formed opening so as to retrieve an article from inside one of the stored opened shipping containers; and a moving means 18 (and 88 of FIG. 8 and 106 of FIG. 10) for moving the retrieved articles to an output 20 of the housing. Element 6 of FIG. 1 represents the delivery of the shipping containers to the housing 4, element 22 illustrates the controller for the elements within housing 4 and element 24 is a user/customer interface for making selections and payments for obtaining articles from the store.

Figure 6:
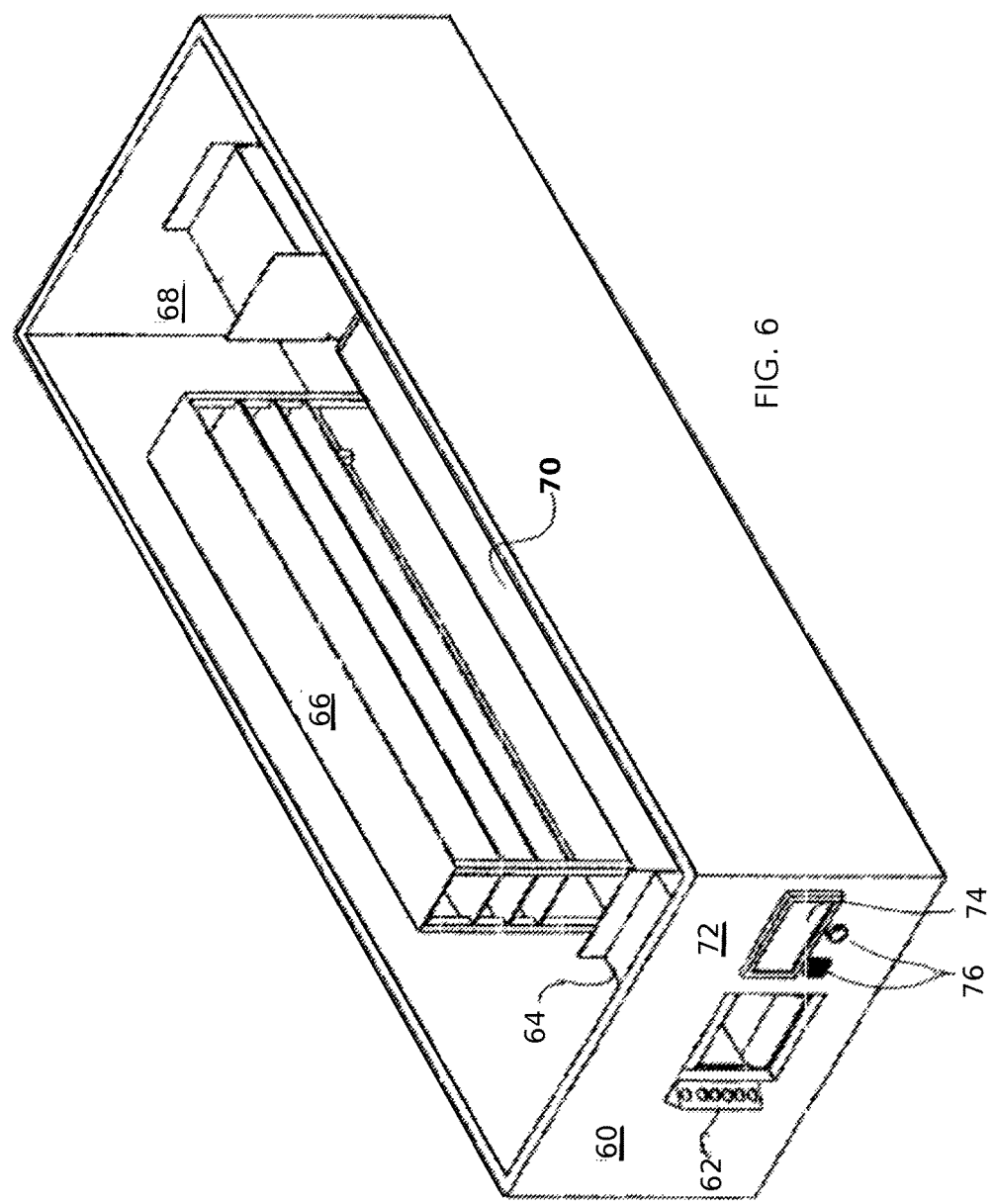
FIG. 6 illustrates a perspective view of one embodiment of the automated storage and distribution system of FIG. 1.
Figure 7:
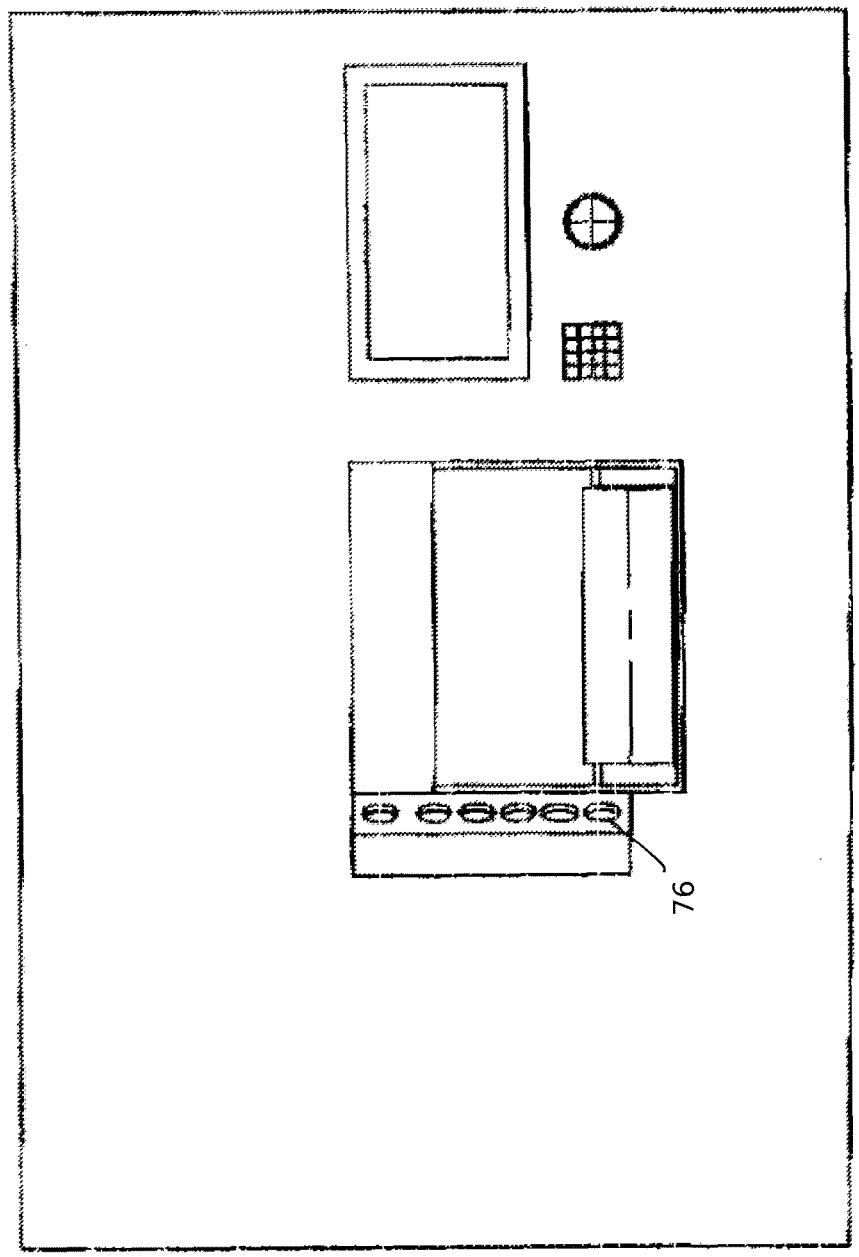
FIG. 7 illustrates a more detailed view of the input port and customer interface of the storage and distribution system of FIG. 6.

As shown in FIG. 6, automated storage and distribution system includes a housing 60, having an input port, including a sensor/scanner/ID device 62 for sensing or scanning or otherwise identifying shipping containers, an interlock area 64, a container storage area 66, an output area 68 and a container conveyor system 70 located between input interlock area 64 and an output interlock area 68. A customer interface 72 is also shown in FIG. 7, and includes a touch screen 74 and article selection and payment interface devices 76 which allows a customer of said automated store to select a desired one or more of the articles stored therein. The customer interface can, in one embodiment, also allow a customer of said automated store to make a payment for the one or more of the selected desired articles. An Internet connected communication device for allowing the customer to access said automated store via the Internet, a touchscreen 74 or other selection and/or payment device 76 located at the site of the automated store can, in one embodiment, also be included in the system. The housing described herein can, in one embodiment, also include means for providing a secure environment for the shipping containers and the other recited means herein which operate the automated store. The entry means can, in one embodiment, include an authorizing means for authorizing the entry into the automated store of only authorized shipping containers without the delivery person entering into the secure area. Furthermore, the authorizing means can, in one embodiment, include means for authorizing a delivery person, which delivery person, once authorized, is deemed to supply authorized shipping containers to said entry means. The authorizing means can, in one embodiment, include the means to communicate with a database in order to confirm that specific shipping containers were anticipated and pre-authorized for entry into the housing. The authorizing means can, in one embodiment, be enabled to communicate in real time to a remote location and/or to a remotely located person and/or computer. The authorizing means includes a shipping container identification (ID) device for determining the identity of a shipping container. The shipping container ID device can, in one embodiment, access a database in order to determine one or more of what articles are contained in the shipping container and how those articles are arranged in the shipping container, based on its determined identity.

If the shipping container is determined to be not authorized, entry into the store is not granted and prevented.

The shipping container ID device can, in one embodiment, further cooperate with a manipulation device for manipulating the shipping container in order to enhance the ability of the shipping container ID device to determine the identity of the shipping container. The manipulation device can, in one embodiment, include one or more of, a gripper mechanism, a robot, or any device that can, in one embodiment, rotate the shipping container. The shipping container ID device can, in one embodiment, include a camera imaging system. The camera imaging system can, in one embodiment, use image or pattern recognition techniques to identify the shipping container and also can, in one embodiment, recognize and identify the articles located inside the opened shipping container. The camera imaging system can, in one embodiment, include a color image sensor for sensing attributes of the shipping containers, which attributes are then compared with information that is stored on a database, either at a local or remote location, so as to identify the shipping container. The camera system or other sensor type system can, in one embodiment, be utilized by the computer control system to enable the guiding of the manipulation device or the article retrieval device, in order to assist the system in securing to the article or package that is intended to be retrieved from the shipping container. This database can, in one embodiment, contain information which is specific to a given shipping container and or a specific article or package which information can, in one embodiment, be utilized by the system in conjunction with information generated by the sensors or camera system in order to facilitate the guidance of the retrieval apparatus and or the manipulation apparatus. This same database can, in one embodiment, also be utilized and/or integrated with the database which is used in determining the whether a container or package is authorized to be in the store. Alternatively, the shipping container ID device may comprise using one or more of a Barcode Recognition system, an RFID system, a Text reading system, an optical scanner, each of the foregoing systems able to be operable with or without the use of the forenoted camera imaging system.

The system can, in one embodiment, include a conveyance system for moving shipping containers that enter into the housing to places further within the housing.

Figure 11:
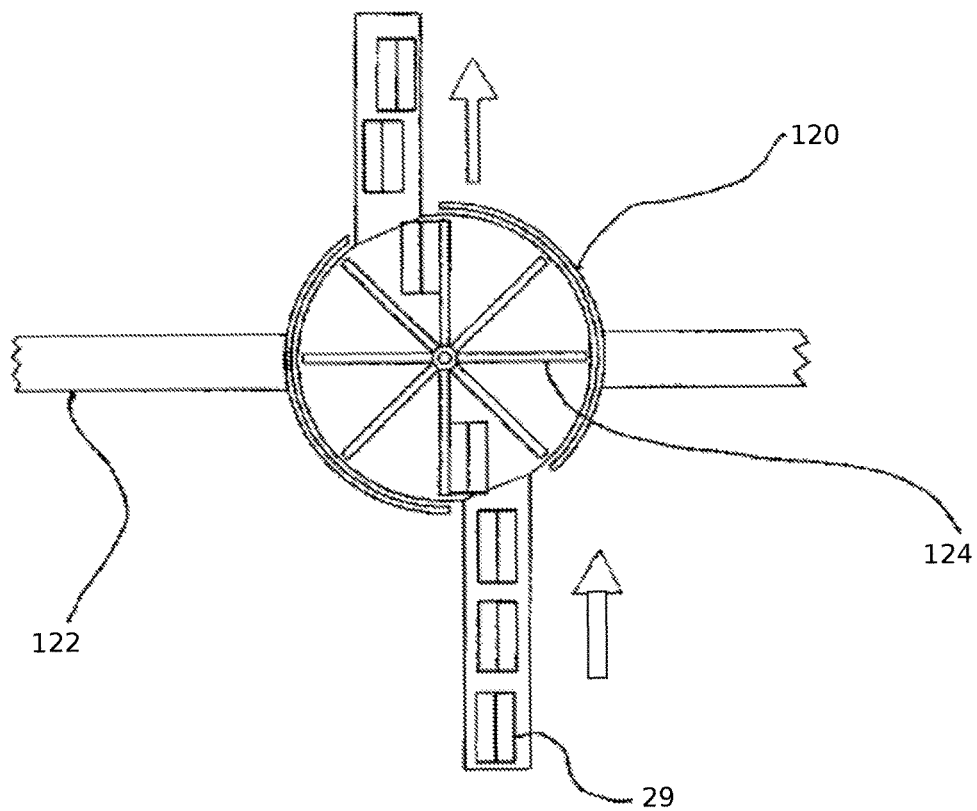
FIG. 11 shows an alternative embodiment of a portal (that is a door system) which can be used for allowing the authorized goods to enter into the housing.

FIG. 11 shows a truck docking station for automatically transferring boxes from a shipping container or box delivery truck to the secure entry portal of the system. In one embodiment, entry portal 126 comprises a revolving door 120 which rotates and allows boxes 29 to be loaded into the portal on one side 128 and the boxes pass through to the other side of the wall 122 and into the inside 126 of the housing. Dividers 124 inside the revolving door apparatus separate the boxes and prevent unauthorized access into the housing by a delivery person or other people. A portal substantially identical to portal 126 could also be used for the output portal of the housing.

Figure 12:
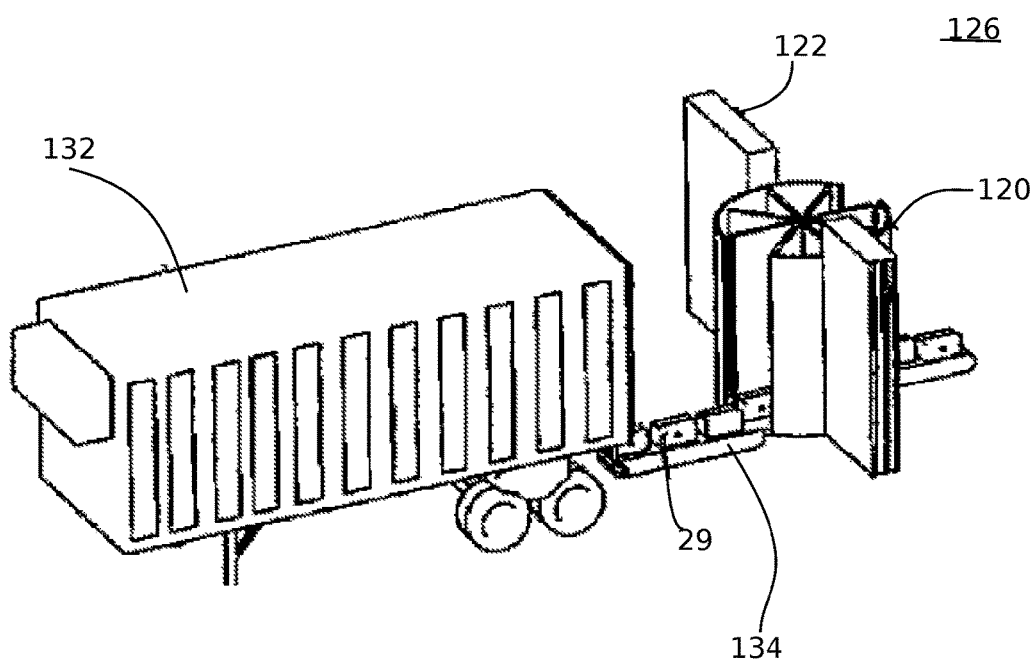
FIG. 12 illustrates a truck and conveyor system which can interface with the portal of FIG. 11.

FIG. 12 illustrates that loading is accomplished via a truck 132 and a conveyor system 134 for loading boxes 29 into the revolving portal 120, which, if authorized, pass through the housing wall 122 and into the secure environment of the housing 126.

In one embodiment, truck 132 can, in one embodiment, have robotic or automated systems which can, in one embodiment, automatically transfer the boxes from the truck onto a conveyor system and that conveyor system can, in one embodiment, connect to the entry portal of a store or warehouse of the above-described type. Using this system, the speed at which the boxes can, in one embodiment, be loaded into the store can, in one embodiment, be accelerated greatly and it can, in one embodiment, avoid the need for other systems or people for the purpose of presenting the shipping containers to the automated entry means or the portal. The truck can, in one embodiment, have a computer which communicates directly with the control system of the store and it can, in one embodiment, communicate the authorization code. In addition, the truck computer and the store computer can, in one embodiment, electronically communicate data back and forth to each other regarding how and when the packages should be transferred between the truck and the entry portal. Other data and electronic linking can, in one embodiment, facilitate other aspects of the transfer and confirm when there is a problem, or for instance when the loading process has been completed, or if and when there is a box that was not authorized to enter into the automated store. In the event that there is a problem, the truck driver can, in one embodiment, use the communications portal on the store system to communicate with a remote computer or person to try to resolve any issues that arise.

This also creates the ability to get a store installed and operational within a day or two with the key requirements being land, an electrical connection and preferably an internet connection.

It also creates the ability to set up a store anywhere without the need for people to be involved in receiving goods from the trucking company.

The system can, in one embodiment, have the ability to have the outside of the structure of the housing be covered with materials designed to make the structure look like a traditional building.

Figure 8:
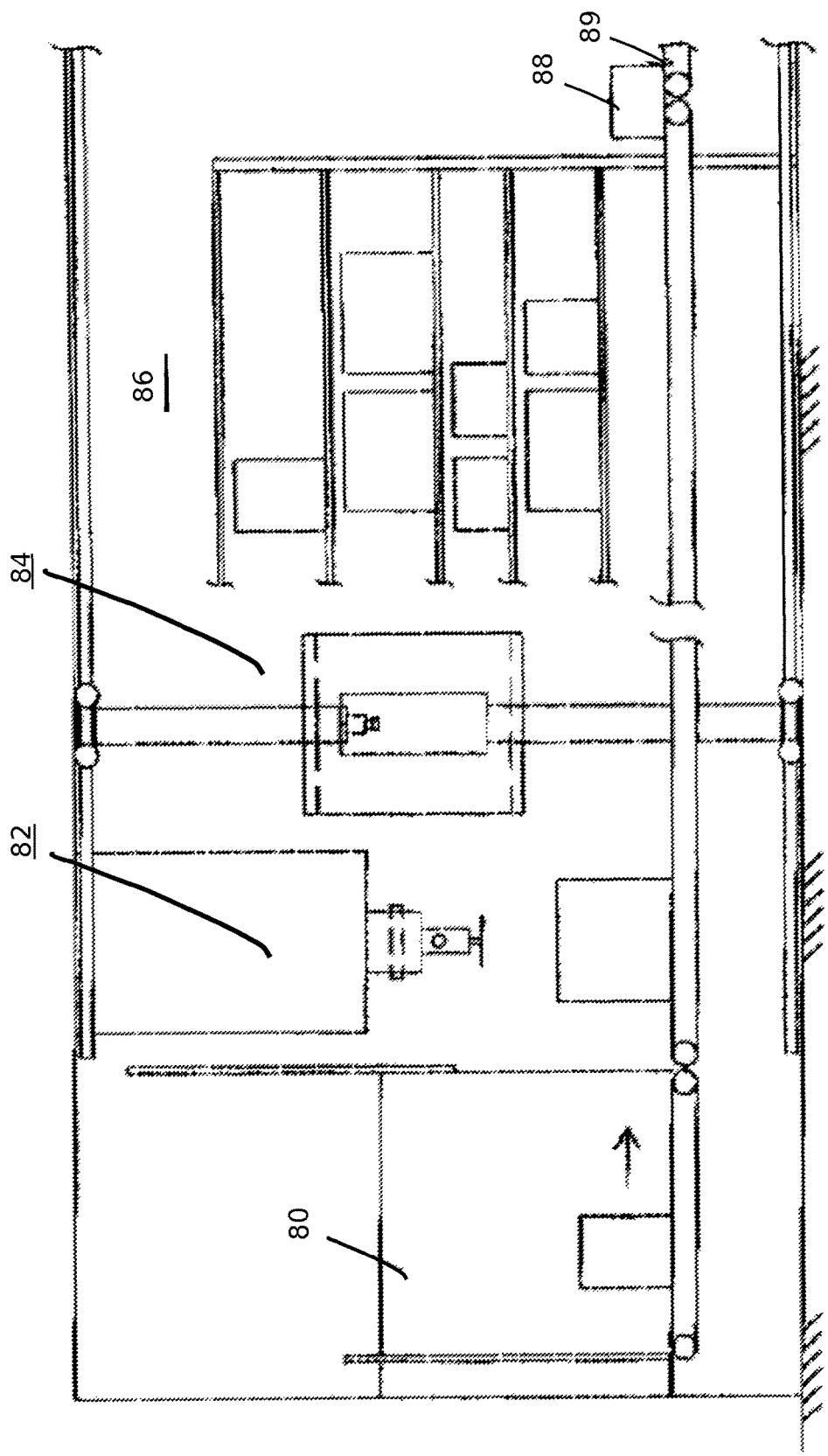
FIG. 8 illustrates a more detailed view of the interior of the housing at the input end and the output end.

As shown in FIG. 8, the shipping containers pass through a secure portal/interlock area 80, where an opening is formed in the shipping containers by a robotic box opening mechanism 82, where the opened shipping containers are conveyed with the assistance of an article retrieval device 84 to a storage area 86, and finally showing a user container 88 which contains articles which were ordered by a user, being moved by a further conveyor 89 toward an output of the housing 4.

The forming means (shown generally as element 12 of FIG. 1, more specifically as element 82 of FIG. 8 and alternatively as elements 140-146 of FIG. 15) can, in one embodiment, operate so as to form an opening in the shipping container at a location and with a dimension that is specific to the identified typed of each of the plurality of shipping containers, so as to thereby ensure that said computer controlled retrieving means can, in one embodiment, enter the opened shipping container by passing through the formed opening.

Figure 15:
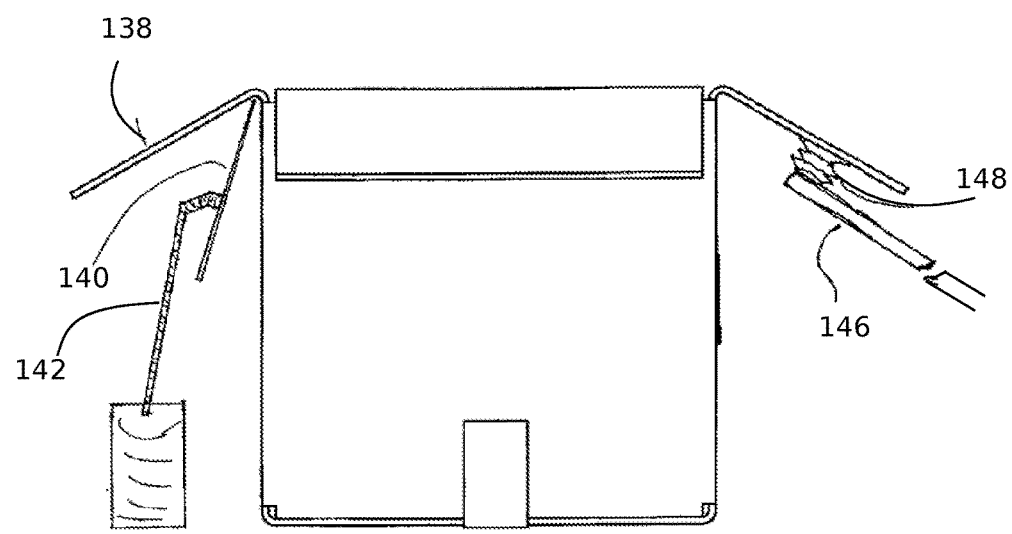
FIG. 15 illustrates details of a cutting device useful for forming an opening in the shipping containers.

In the embodiment shown in FIG. 15, the opening device is opening the box at the seam of the box and lifts open the flaps of the box in preparation for cutting them off to form the article retrieval opening.

FIG. 13 shows a shipping container 29 with flaps 138 partially opened up as happens if using the type of automated box opening apparatus described herein which cuts the tape first and then lifts the flaps to either cut the flaps off of the box or to alternatively not cut the flaps off.

FIG. 14 shows two more views of the box 29 with the flaps already in the position before flaps 138 would be cut off.

The system can, in one embodiment, determine where to create an opening location into the box based on information (stored, for example in a computer memory) on specific parameters of the box, including, for example, based on the physical layout of the articles inside the container. The forming means forms the opening by removing from the shipping container a side thereof, removing a portion of the outside surface of the shipping container, or by removing tape which is sealing the opening and thereby unsealing and lifting up flaps of the container, and then alternatively on other embodiments, physically separating the flaps from the container or securing the flaps to exterior side of the container, for example using tape to tape the flaps to the sides of the box in the opened position, in a manner so as to form the opening in the container. The system can, in one embodiment, further include a disposing device for disposing of material removed from the shipping containers to make the opening.

It is noted that one method that may be used for forming the opening in the shipping container (hereinafter sometimes called a "box" or "master carton"), uses an automated machine that slices the tape which is typically used to seal the flaps closed for shipping, lifts the flaps, and places a blade into the corner on the underside of the box flap where the flap meets the rest of the box and moves along the length of the flap to cut it off from the box. Furthermore, suction devices such as a suction cup and vacuum system to grip the flaps and manipulate them to an open position, and then grips the flaps for removal and disposal.

As shown in more detail in FIG. 15, the box opening device includes a suction device arm 146 and suction cup 148 holding and moving the flaps 138 of a box 29 into a retracted position, so as to be prepared for an automated cutting system 144 to cut off the flaps 138 of the box 29. Automated cutting system 144 has an arm 142 which positions a cutting blade 140, which can, in one embodiment, either be a rotating blade or other moving blade, under the flap 138 so as to be able to cut off the flap 138 from the box 29.

It is also noted that an automatic or robotic de-palletizer can, in one embodiment, be used to bring shipping boxes to the housing by automatically transferring the shipping boxes from a pallet, which pallet was delivered by the delivery entity, to the entry means. Alternatively, a system with a secure entry portal that is large enough can, in one embodiment, be used to transfer an entire pallet of shipping goods into the housing through the secure entry portal and then a de-palletizing system can, in one embodiment, operate inside the housing to transfer the boxes to the box opening system and or the storage racks. Similarly, a "palletizer" can, in one embodiment, be used after the article retrieving device for putting multiple ones of user delivery containers destined for a single user onto a pallet, before being provided to the exit portal.

It is noted that a "user delivery container" as used herein means any container used by the system to provide the user/customer requested articles to the user/customer via the output port of the system.

Figure 10:
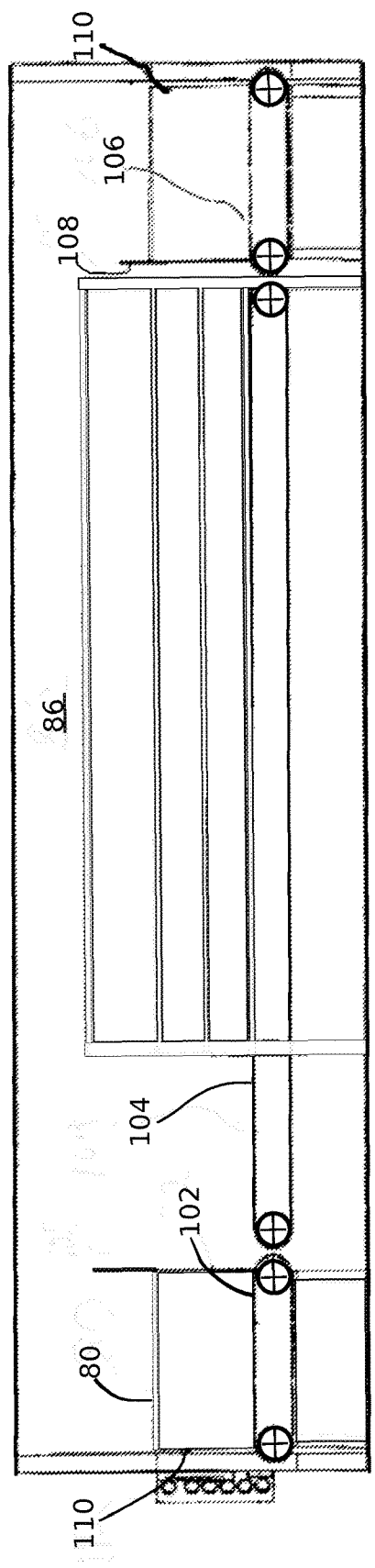
FIG. 10 shows one embodiment of a conveyor system for use in the housing of FIG. 1.

As shown in FIG. 10, the housing has a first conveyor 102 for transporting the authorized containers into the interior of the housing 60, a second conveyor 104 for transporting the containers to the opening means, as well as to the storage means 86, and a third conveyor 106 for transporting the selected articles and containers through the interlock area 68 to an output port leading to the exterior of the housing. Note internal and external doors 108 and 110, respectively, for the interlock areas.

Figure 9:
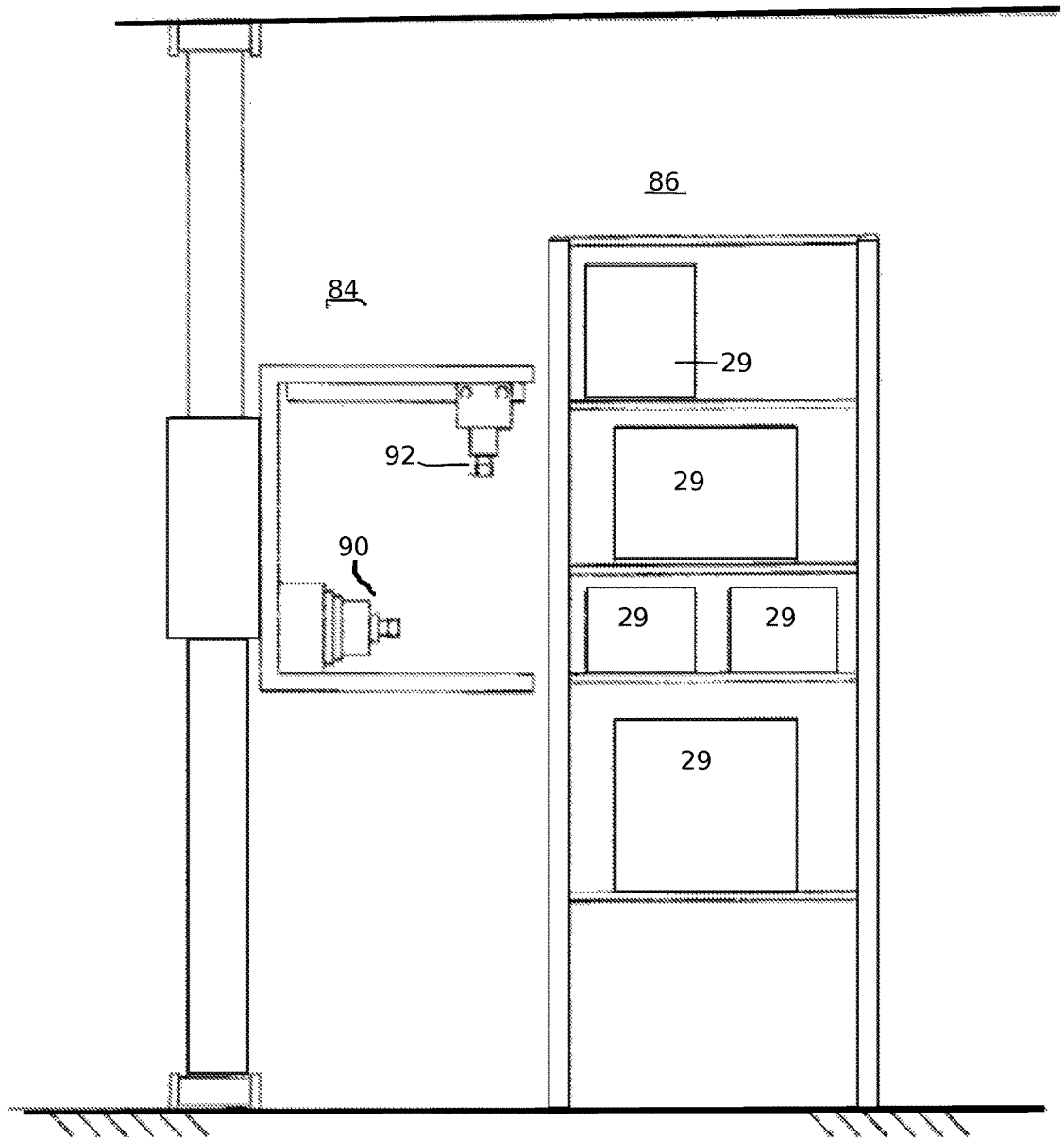
FIG. 9 illustrates one embodiment of an article retrieval device 84 for the invention.

As shown in FIG. 9, the article retrieval device 84 uses a first robotic device 90 for positioning the opened containers 29 into and out of the storage area 86, and a second robotic device 92 for retrieving articles from inside the opened containers by using the openings as shown in FIGS. 3, 4 and 5.

The article retrieving device can, in one embodiment, include a vision system, and/or pattern recognition to guide the retrieval device for retrieving said articles from said shipping containers. The robotic article grasping device may use vacuum sensing for determining when said article retrieving device has grasped an article. The article retrieving device can, in one embodiment, include one or more of a robotic device, gantries, and grippers of different sizes and shapes, and methods, for example, the grippers can, in one embodiment, be of the type with use one of more of suction cups or electro-mechanical gripping devices for grasping articles from the shipping containers. Using the pattern recognition techniques, the vision system can, in one embodiment, also determine what types of articles are in the box, and using this information for further determining where to store the box and/or how to remove items from the box.

In one embodiment of the apparatus, the action of picking of the articles from a given opened shipping container or master carton is performed proximate (adjacent) to the storage shelf where the given master carton had been stored prior to the picking of the articles. And furthermore wherein the action of picking of the articles from a given master carton is performed while the given master carton is situated adjacent to the storage structure and in or near the same location which the carton had been stored in prior to the picking of the articles. In this way the system is not bringing the master carton to a common picking location where a dedicated picking system is located.

In another embodiment of the apparatus, the order picking of articles can, in one embodiment, be from within a first and second one of open shipping boxes, which picked articles are then used to fill a third box, which third box is then conveyed out from the automated warehouse through a secure exit or delivery portal to a truck which then transports the third box to an automated store which automatically receives the goods and opens the shipping boxes and redistributes the articles within as needed to a user of the store.

The apparatus can, in one embodiment, use a specific vision software algorithm in a preferred embodiment to be used to perform article retrieval from the master carton which algorithm is used to detect patterns in the view of the camera and then use the recognized patterns to deduce and predict where the remainder of a given article or package may be. The apparatus can, in one embodiment, be used in conjunction with pattern recognition software to remove one loosely packaged/randomly packaged article from a case of a plurality of articles, which package was located in a random or unpredictable position. Furthermore, wherein the packages to be removed are packaged in flexible material and which packages are not positioned in a precisely predetermined location within the shipping carton. Furthermore the apparatus which is used to remove the article may be a vacuum gripper and wherein the vacuum used is a vacuum blower. The vision system can, in one embodiment, be used in conjunction with per case pick points from a database which help the retrieval device determine where to move in order to grasp an article to be removed.

The housing can, in one embodiment, be one of a fixed structure, such as a stand-alone housing, a building, or a portable structure, such as a trailer. The housing can, in one embodiment, also be adapted to be located at a position that is one of above ground or underground. The housing includes a secure input system which permits only authorized entry of containers or people to places within the housing. The secure input system includes an interlock area having an exterior door for preventing entry into the interlock area. The opening of said exterior door can, in one embodiment, be enabled to open when the authorizing means has authorized the entry into the automated store. The authorized opening of the exterior door can, in one embodiment, also be enabled by utilizing a physical lock and key or other similar type of device.

The interlock area can, in one embodiment, be adapted to receive, and then automatically pass there through, without human interventions, only authorized shipping containers. The interlock area can, in one embodiment, be an area bounded by the exterior door and an internal door, where passage of authorized containers past the internal door can, in one embodiment, only occur after said exterior door has been closed and a sensor has determined that only authorized persons or shipping containers are in the interlock area.

The automated store can, in one embodiment, have storing means also to store therein received shipping containers which have not been opened, so that said not opened shipping containers can, in one embodiment, be delivered to the output of the housing. The automated store can, in one embodiment, also deliver to a user a combination of articles which were retrieved from opened shipping containers as well as delivering unopened shipping containers to the user.

The store has storing means for storing containers, which storing means can, in one embodiment, include a plurality of storage areas for receiving for storage therein said shipping containers. The storage areas can, in one embodiment, include an arrangement of one or more bins or racks. The storage means can, in one embodiment, store the opened or closed shipping containers in a position which is best suited for the article retrieving device to retrieve articles from the container, or to just retrieve the unopened container. This may include storing opened shipping containers with the opening facing upward or towards the retrieval mechanism or in another direction which is suitable to the successful retrieval of the articles inside the shipping containers. This can, in one embodiment, include racks that are situated to squarely present the containers to the retrieval apparatus, or to present them at an angle, or with the opening facing upward, or with opening frontward so as to be facing towards the retrieval apparatus, or stored in a position which keeps track of the location of the inside layout or positions of the articles based on the database information relating to that specific type of container type and/or article type stored in that container type. The shipping container can, in one embodiment, be stored in a specific position and with a specific orientation so that, for example, not only is the opening facing a certain direction while it is positioned in the storage location, but the container may be also positioned so that specific sides of the container may be facing in a certain direction, so that the system can, in one embodiment, determine where to place the retrieval apparatus in order to be able to grip to one of the packages.

In one embodiment, the invention comprises an enclosed and secure structure or housing which can, in one embodiment, limit people from gaining access into the housing, and more particularly from gaining access to any of the articles or containers located inside the housing. In this embodiment, the invention includes:

a loading port for receiving a plurality of closed shipping containers, the plurality of shipping containers can, in one embodiment, include a variety of differently shaped or differently dimensioned shipping containers which contain articles therein and/or articles to be transported into the housing, a security authorization means for ensuring that only authorized shipping containers are allowed to either enter into the housing or additionally or alternatively to be stored in the system, a shipping container detection means that enables the system to detect the position and/or location of at least a portion of the outside surface of the shipping containers which have been loaded into the housing, an opening means for forming an opening in the shipping containers, a conveyance means for conveying the opened shipping containers to storage locations for storing at least some of the shipping containers, a retrieval means for retrieving articles, and/or packages containing articles, from inside the shipping containers, a conveyance means for allowing containers and/or articles to be transported from within shipping containers located inside the housing to a user of the system who is outside of the housing and the user of the system can, in one embodiment, access and remove the articles being distributed from the system.

In addition, the system can, in various embodiments:

have a user interface such as a touch-screen video system, typically located outside of the secure housing, such as shown in FIG. 6, in order for the user to communicate with the system and for inputting data such as order selections into the system, have computer controlled sensors and other technology including electromechanical sensors, pattern and or image recognition hardware and/or software in order to identify a specific shipping container, a specific article or package type, and or the location and orientation of a specific shipping container or the location and orientation of a specific article or package which is located inside a shipping container, and have a computer control means for controlling some or all of the various apparatus within the system including some or all of the apparatus described herein.

In other embodiments, the system can, in one embodiment, also include the ability to retrieve one of a plurality of articles from inside various shipping containers which are stored inside the housing and move the plurality of articles into a single user container which is supplied from within the housing and can, in one embodiment, include containers such as a paper bag, a plastic bag or a cardboard box.

Thus, my prior PCT application shows and describes an automated storage and distribution device, configured as a selling device, having the following features:

a housing which separates an uncontrolled area which exists outside of the housing from a controlled area which exists inside the housing, which controlled area is intended to be fully automated in it's functional operation as a selling device without the requirement of human presence inside of the controlled area;

a receiving area coupled with the housing for receiving from outside of the housing shipping boxes which have been delivered to the automated selling device;

an authorization means for verifying that the delivered shipping boxes are authorized to enter into the controlled area inside of the automated selling device;

automated shipping box entry means, coupled with the authorization system, for allowing movement of only authorized ones of the delivered shipping boxes so as to enter into the controlled area inside of the housing, said authorization system and automated box entry means preventing at least the delivery person from entering into the housing through the box entry means;

an automatic input conveyance means for controlling movement of the delivered shipping boxes from the box entry means into the controlled area inside of the housing;

an automatic box opening means located in the controlled area inside of the housing for receiving a plurality of the delivered shipping boxes and creating an article retrieving opening in said delivered shipping boxes;

a storage means for causing automatic storage of the opened shipping boxes in a storage area portion of the controlled area inside of the housing;

an automatic retrieval means for retrieving at least one article from inside each of at least two opened shipping boxes and placing the at least two retrieved articles into a user delivery container; and automatic output conveyance means for moving the user delivery container to an exit port of the housing; wherein the exit port allows the user delivery container to be moved from the controlled area inside of the housing to an end user located outside of the housing, said exit port preventing at least the end user from entering into the housing through the exit port.

ADVANTAGES

It is noted that with the above system, instead of using a delivery container to deliver one or more articles to a customer, multiple articles can be delivered to the customer without the use of a delivery container or one or more articles being delivered within a delivery container and one or more articles not being within a delivery container. For example, the customer may receive at the output portal/customer interface, a bag or box with several items, and then get large plastic bottle as the last delivered item.

It is noted that although the "housing" portion of the automated selling device may at first glance thought to be equivalent to no more than the housing of a vending machine, the unique features noted above allow and enable the storage and selling device to be a much more useful and efficient selling device.

For example, the combination of the authorization means and the automated shipping box entry means, provides an arrangement where only delivered shipping boxes authorized to enter the housing, are actually allowed to enter the housing, and the actual entry of the delivered shipping boxes, with assistance from the automatic input conveyance means, is all automatic, that is, without human assistance.

Thus, no humans are required to be inside of the housing to control the entry into the housing of the delivered shipping boxes, and no humans are required to be inside of the housing to process the delivered shipping boxes for opening them to provide access for retrieval of the articles therein, storage of the shipping boxes and, in response to an order, actual retrieval/order-picking from the stored shipping boxes, as well as to provide for the delivery of the picked articles to a location of the housing which is accessible from outside of the housing, and from which location access by humans to the controlled area inside the housing is prevented.

Additionally, it is noted that the automated shipping box entry means also prevents access by humans to the controlled area inside the housing. Human access to the interior of the housing may be proved by a convention door with a lock and key arrangement, in order that humans can, in one embodiment, enter the housing for maintenance and repair, as well as set-up and dis-assembly.

Prior automated retail stores have required a person to be inside a building or structure for a period of time in order to load product into the machine/store, as well as to actually distribute or sell the product from the store. Since this system is designed so that the space inside the housing is automated to the point that the goods are loaded, processed, stored and distributed automatically, it does not require any people inside it in order to function. Thus, with the above article storage and distribution/selling device, many of the "manpower" and "real estate" costs involved in the operation of the storage and distribution system (i.e., a retail store or a warehouse distribution system built according to the present invention), are avoided. Such costs include: the requirement to provide an environment "habitable" to employees, such as sufficient area for them to work and sufficient light, air, heat etc., a place for them to take care of personal needs (such as a bathroom), the provision of vacation time, time off, administrative and management employees to oversee lower level employees, etc. All these costs are avoided, as well as all of the other overhead and indirect costs of employees. Without employees, the size of the store can, in one embodiment, be limited to not much more than is needed to actually store and distribute the articles to be dispensed, and the real estate required to meet such habitability needs of employees is avoided. Additionally, because there are no employees, there are far fewer federal, state and local laws and regulations that must be obeyed. For example, not only all those that apply directly to employee needs, but also those relating to fire and safety, Americans with Disabilities, etc, etc.

Thus, the system is intended to provide reduce costs of construction and operation, as well as other advantages, such as: reduced space requirements and real estate rental costs as compared to a traditional building, reduced electrical costs for utilities and lighting, the ability to place systems that do not need to conform to building codes related to internal fire suppression, other human safety issues (since there are no people working inside), the ability to get such a store installed and operational within a day or two with the key requirements being only land, an electrical connection and preferably an internet connection, the ability to set up a store anywhere without the need for people to be involved in receiving goods from a box delivery company, the ability to have the outside structure of the housing be covered with materials designed to make the structure look like a traditional building, etc.

Additionally, insurance costs, stolen goods costs, real estate costs, utilities costs, labor costs, management costs, damaged goods costs and many other costs associated with traditional warehousing or traditional consumer stores are reduced or eliminated. Further benefits are gained due to the ability to have an automated and compact and densely stored goods system, as well as by having an automated system for receiving, opening, storing, retrieving and delivering goods and articles wherein the total system can, in one embodiment, be designed to be modular and which furthermore can benefit from being located in modules which can, in one embodiment, be stacked above ground, below ground or a combination of either, and in such a manner as to be very efficient in regards to the use of real estate. This efficiency of use of real estate, together with the lack of virtually any labor, and in conjunction with the benefits to the user of a highly efficient system, combine to create significant benefits which will reduce the cost and increase the efficiency of business and the will create opportunities for reduced cost to the user and consumer. The system also has the benefit of being able to be located at a low cost very close to where a given local population lives, so that as part of a larger distributed system, the system can, in one embodiment, accomplish goals not achievable before.

Another particular advantage of the above system and its various embodiments, as compared with prior art storage and distribution systems, or retail stores, is that a significant cost of such prior art systems is due to the labor involved in moving cartons (with or without further articles positioned therein) from the manufacturer to an intermediate storage/distribution facility and from there on to the location where the user will pick-up the articles (i.e., such as onto the shelf of the retail store). Such shipping, storage and handling costs experienced by the article manufacturer and the store owner/operator are ultimately passed on to the end customer, as reflected in a higher final sale price of the article. On the other hand, the system of the invention allows the storage and distribution system (i.e., a retail store or a warehouse distribution system built according to the present invention) to leverage existing article transportation infrastructure and services, such as the United Parcel Service (UPS) and Federal Express (Fex Ex) or other general trucking and transportation companies, to deliver the containers to the housing of the inventive system. These existing transportation service company's typically provide for article transportation to literally any place on the globe at a highly efficient and competitive price. Thus, by using such service company's for container transportation and loading of a structure in accordance with the present invention, this feature results in a significant savings over an article manufacturer having to distribute his products on his own, thereby requiring a fleet of trucks, drivers and a plurality of centrally located distribution centers as well as all of the trustworthy personnel required to stock the shelves and or pick the products.

In this regard, it is noted that the various delivery personnel, such as a plurality of parcel services, trucking companies etc., which do not have to have any particular relationship of trust with the facility can, in one embodiment, "load" the system. In other words, where an automated system such as a vending system or automated retail device, which traditionally requires a trusted agent or employee to go and gain access to prior systems in order to load new articles into the system, and where these employees are dedicated specifically to loading the automated machines, and their trucks and warehouses and logistical systems are all specifically dedicated to dealing with and loading the prior machines (and since these people, trucks and equipment are all dedicated only to managing the equipment), it is important that the operator of the vending system or automated retail device have employees whom he can, in one embodiment, have significant trust in and a formal business relationship with (since he needs to rely upon the dedicated loading person to load carefully and properly, load items in the correct place, to be honest and not to steal from the system, operator or owner of the automated retail or vending system).

Thus, it is not possible to fully benefit from the economies of scale that would be possible if instead the system was able to be loaded automatically and thereby leverage the existing efficient general transportation industry. By having the box opening and loading into the system being fully automated, the owner or operator of the system does not need to have a trusted person "load" the machine since the only requirement is to have the boxes be delivered to the system and placed on the conveyor system. One of the many great advantages of the present invention is therefore to enable an operator or owner to utilize common carriers or general and non-dedicated transportation companies to deliver the boxes since there is no longer a need to have a trusted person open boxes, or load articles into the system.

NEW OPERATIONAL METHODS

Consequently, the many unique features of such an automated system present the possibility for many new ways to approach the storage and distribution and/or selling of articles, when such an automated device is used.

Thus, the present apparatus arranged as a selling device, enables the various producers of goods to directly control the sale of their goods to the consumer, while doing so in a structure that can, in one embodiment, appear to the consumer to be a single, unified, retail store. This retail store can, in one embodiment, enable a goods supplier to store and sell his goods directly to the consumer from a physical retail store location which is in close proximity to the consumer/end user without requiring the goods supplier to have any employees or agents to be present to protect his interests. This is made possible by various producers or distributors of goods being able to rent a portion of the automated store, and then ship their goods to the store and control the space allotted within the store for their goods in an electronic way, such as by use of a computer network.

Additional business methods use an agent of the delivery entity to initiate the automated loading of the system, and therefore no receiving agent or loading person is required. This advantageous result is made possible by having an authorizing code communicated in advance between the parties, which code provides for automatic loading and entry of containers into the device by the delivery entity.

Goods which are being delivered to the store have a delivery code which was established between two parties (a first party in control of the automated store, and a second party in control of delivery of goods) associated with them, such as an order number which may include a code associated with a specific supplier or type of goods, and where the goods were ordered prior to the delivery, and wherein the delivery code is communicated by the delivery agent before the shipping cartons will be allowed to enter into the housing.

In another embodiment of such an automated retail store, since the receiving function of the store is automated and controlled by a computer system, the location within the storage area which the goods are intended to be stored is determined in advance and the automated receiving and storage system will control and limit the amount of goods which a given entity can have entered into the store at any given time. Given that the process of receiving shipping boxes into the store and the process of storing the boxes in the storage area are controlled by a computer which is governed by predetermined rules established by the above-noted agreement between the various entities having a business relationship with the automated retail store, any one entity is prevented from trying to utilize the space allotted to another entity (and in a narrower version of this embodiment, unless the other entity grants permission).

Since none of the entities have physical access to the actual inside of the store or the inside of the goods storage area, they cannot affect the goods of other entities.

Thus, advantageously, the controlled storage space inside the housing can be apportioned in several different ways. For example, the space inside the machine can have specific areas with specific physical locations assigned to them which are areas designated only for use by a specific given entity. In another example, the portion of space designated to a specific entity can be based on a total of cubic area or space within the whole store, regardless of where in the store their various boxes or shipping containers happen to be stored at any given time. In this situation, their portion of space is an amount of space without a specific dedicated location or area within the store or storage area.

Each entity which controls a portion of the store's space can control, through a computer network such as the internet, what goods are allowed to be loaded into their respective space and/or what pricing and other parameters they would like to set regarding the receiving, handling, storage and or sale of the goods which are loaded into their space.

Thus, a first method of operating an automated article selling device comprises:
  providing a housing which separates an uncontrolled area which exists outside of the housing from a controlled area which exists inside the housing, which controlled area is intended to be fully automated in it's functional operation as an article storage and selling device without the requirement of human presence inside of the controlled area;
  providing an automated shipping box entry means which allows controlled movement of only authorized ones of delivered shipping boxes to enter into the controlled area inside of the housing;
  providing an automatic box opening means located in the controlled area inside of the housing for creating an article retrieving opening in a plurality of the shipping boxes;
  moving said opened shipping boxes to a storage area portion of said controlled area inside of the housing;
  providing an exit port for the housing;
  providing an article retrieval system which, in response to a user of the automatic selling device placing an order for purchase of articles stored in the selling device, retrieves at least one article from inside each of at least two opened shipping boxes located in the storage area, which articles are then automatically placed into a user delivery container and automatically moved to the exit port, where said user can take control of the user delivery container; and
  making an agreement between a plurality of separate entities, which agreement provides that each entity has limited control over the movement shipping boxes into the storage area of the housing.

A second method of operating an automated article selling device comprises:
  providing a housing which separates an uncontrolled area which exists outside of the housing from a controlled area which exists inside the housing, which controlled area is intended to be fully automated in it's functional operation as an article storage and selling device without the requirement of human presence inside of the controlled area;
  providing an automated shipping box entry means which allows movement of only authorized ones of delivered shipping boxes to enter into the controlled area inside of the housing;
  providing an automatic box opening means located in the controlled area inside of the housing for creating an article retrieving opening in a plurality of the shipping boxes;
  providing automatic storage of the opened shipping boxes in a storage area portion of the controlled area inside of the housing,
  where in response to a user of the automatic selling device placing an order for purchase of articles stored in the selling device, an automated article retrieval means retrieves at least one article from inside each of at least two opened shipping boxes, which articles are then automatically placed into a user delivery container and automatically moved to an exit port of the housing, where said user can take control of the user delivery container, and where
  an agreement is made between a plurality of separate entities, which agreement provides that each entity has limited control over the movement of shipping boxes into the storage area of the housing.

The first or second method, where the agreement provides that the limited control allows movement of the shipping containers of a given entity into only a given percentage of the storage area of the housing.

The first or second method, where each of said entities is one of either a manufacture or a supplier of articles to be sold by the selling device.

The first or second method, where each of the said entities controls the types of articles that are authorized to be stored within their portion of the storage area of the automated selling device.

The first or second method, where each of the said entities controls the types of articles that are authorized to be sold from their portion of the storage of the automated selling device.

The first or second method, where the limited control granted by the agreement to each of the said entities allows respective ones of the entities to control:

how their authorized articles are merchandised by the automated selling device.

to control the selling price of their authorized articles, to control if any sales promotions are to be utilized, to control authorization of opened shipping containers from one automated selling device at one location, to be resealed (if they were opened) and reshipped to another automated selling device at a location different than the location of the first automated selling device.

The method of any preceding paragraph, where instructions are input to a computer system of the automated selling device in accordance with an agreement determined in advance between the parties, so as to control the automated shipping box entry means and the moving of the shipping boxes to the storage area, so articles which actually become stored in the housing are limited by terms of the agreement The method of the preceding paragraph, where the instructions input to the computer system prevent any one entity from utilizing space in the storage area that is allotted to another of said entities, plus one or more of the following:

where permission is given to allow one entity to use storage space allocated to another entity.

where the storage space is apportioned into specific physical locations in the storage area assigned to each of the entities, which locations are areas designated only for use by a specific given entity.

where storage area is apportioned based on a total of cubic space of the storage area, regardless of where in the storage area the shipping containers of each entity happen to be stored at any given time and in this situation, each entity's portion of space is an amount of space without a specific dedicated location or area within the storage area.

The method of the preceding paragraph, wherein each entity controls a portion of the storage space by using a computer network, such as the internet, to control which articles are allowed to be loaded into their respective storage space and/or what pricing, terms of sale and other parameters they would like to set regarding the receiving, handling, storage and/or sale of the articles which are loaded into their storage space.

The method of the preceding paragraph, wherein said agreement between the entities includes a rental agreement for the storage space.

The first or second method, wherein said agreement enables said separate entities to sell goods directly to a common customer by using the automated article selling device.

The first or second method, where the instructions input to the computer system of the automated article selling device enforce the agreement between the entities, by controlling the entry into the automated article selling device of the shipping containers having the articles from the entities that are to be sold. That is, if the articles are not allowed entry into the automated article selling device, they won't get sold by the device.

The first or second method, where the instructions input to the computer system of automated article selling device control the type and quantity of articles which enter into the storage area.

The first or second method, where the instructions input to the computer system control the quantity of articles from a given entity which enter into the storage area as a function of the total amount of a descriptive parameter of the articles allowed to be stored in the storage area.

wherein goods of at least two entities enter into the storage area, and wherein the goods of the at least two entities are stored in a shared portion of the storage area.

wherein the descriptive parameter is:

based on size based on product type based on dollar value based on quantity where the plurality of separate entities are independent of one another where the plurality of separate entities are unrelated parties The first or second method, where the articles from a plurality of entities become stored in the storage area, and separation of the articles of the different entities within storage area does not rely upon physical barriers in the storage area in order to apportion a space which is allocated to the articles of each of the various entities having articles stored therein.

The method where the amount of space given one of the entities to store articles, is determined by computer control of the article retrieving system.

The first or second method, where the instructions input to the computer control system enforce rules established in the agreement between the entities.

The first or second method, where the agreement establishes that the entities maintain ownership of the articles which are moved into the storage area until they are sold from the automated selling device.

The method of the preceding paragraph, where the rental agreement establishes a rental fee which a given one entity pays to the operator, manager or owner of the automated selling device, which rental fee is at least partially determined by the amount, quantity, profit margin and/or total profitability of the sales of the articles from that selling device by that particular entity.

The method of the preceding paragraph, where the rental agreement establishes a rental fee which a given one entity pays to the operator, manager or owner of the automated selling device, which rental fee is at least partially determined by the amount of space required in the controlled storage area for the storage of the articles of the particular entity.

The method of the preceding two paragraphs, that is, where the rental fee is at least partially determined by the amount of space required in the controlled storage area for the storage of the articles of the particular entity, as well as the amount, quantity, profit margin and/or total profitability of the sales of the articles from that selling device by that particular entity.

In one situation, the entity that controls both the automated store and the entry of goods into the automated store and can also control what types of goods from which suppliers of goods will be allowed to enter into the store.

In such a situation, the agreement between the entities may be that the goods that enter the store remain owned by the supplier of the goods until one or more of the following:

The point at which the goods are moved or sold from the store to a user of the store and wherein the goods are thereby considered sold by the goods supplier directly to the end user who receives the goods from the automated store. In this situation the entity that controls the store does not buy or own the goods, but simply enables his store to facilitate a sale between the goods supplier and the end user. In the event that a plurality of goods are combined in the sale to the end user, then the entity that controls the store will have facilitated a sale between each one of a plurality of separate goods suppliers and one end user.

The point at which the goods are moved or sold from the store to a user of the store and wherein the goods are thereby are agreed to be considered sold by the goods supplier to the entity which controls the store after the end user of the store placed an order for the goods and prior to the goods being transferred to the end user who receives the goods from the automated store.

In another situation, one entity has control of the store and another entity different from the first, is the supplier of goods to the automated store, which supplier can control the entry of at least some of the goods that enter into the automated store.

In such a situation, the agreement between the entities may be that the goods that enter the store remain owned by the supplier of the goods (or alternatively, in another embodiment, are not sold to the entity that controls the store) until one or more of the following:

The point at which the goods are moved or sold from the store to a user of the store and wherein the goods are thereby considered sold by the goods supplier directly to the end user who receives the goods from the automated store. In this situation the entity that controls the store does not buy or own the goods, but simply enables his store to facilitate a sale between the goods supplier and the end user. In the event that a plurality of goods are combined in the sale to the end user, then the entity that controls the store will have facilitated a sale between each one of a plurality of separate goods suppliers and one end user.

The point at which the goods are moved or sold from the store to a user of the store and wherein the goods are thereby are agreed to be considered sold by the goods supplier to the entity which controls the store after the end user of the store placed an order for the goods and prior to the goods being transferred to the end user who receives the goods from the automated store.

In another situation, there is an entity which controls the store and there is a separate supplier of goods to the automated store which can control the entry of at least some of the goods that enter into the automated store.

In such a situation, the agreement between the entities may be a partial portion of all of the goods of a certain type which enter the store remains owned by the supplier of the goods (or alternatively, in another embodiment, are not sold to the entity that controls the store) until one or more of the following:

Proximate to or after the time when the goods are ordered by a user of the store, or proximate or after to a time when the goods are retrieved from a shipping carton for transfer to an end user or sold from the store to a user of the store and wherein the goods are thereby considered sold by the goods supplier directly to the end user which receives the goods from the automated store. In this situation the entity that controls the store does not buy or own the goods, but simply enables his store to facilitate a sale between the goods supplier and the end user. In the event that a plurality of goods from a plurality of goods suppliers are combined in one sale to the same user, then the entity that controls the store will have facilitated a sale between each one of a plurality of separate goods suppliers and one end user.

The point at which the goods are moved or sold from the store to a user of the store and wherein the goods are thereby are agreed to be considered sold by the goods supplier to the entity which controls the store after the end user of the store placed an order for the goods and prior to the goods being transferred to the end user which receives the goods from the automated store.

Additional descriptions of the novel methods include

A business method having an agreement between a first party and at least a second party, where the first party uses the second party to deliver goods to an automated store and furthermore, wherein:

the store has a storage area for storing goods to be sold from the store, and the first party has a financial interest in the operations and sales of goods sold from the store, and the second party is (at least) a deliverer of goods which are to be delivered to the store, and the store includes a goods transfer system which operates in conjunction with a secure loading port for enabling the second party to transfer the delivered goods through the secure loading port and into the storage area inside of the store, and the secure loading port is able to limit the second party from accessing any of the goods which are stored in the storage area of the store, and the store having means for determining the identity of the goods being transferred into the store, and the store being able to dispense goods through a delivery port, in response to receiving electronic orders for goods which are located in the store Furthermore, the inside of the store is unmanned, and is designed to allow the second party to transfer the delivered goods to the inside of the store, while still limiting the second party from accessing any of the goods which are stored in the storage area of the store, and where the second party is allowed to transfer the delivered goods to the inside of the store in response to an order for goods which is received from a customer, an agent, a website, a purchasing entity, etc.

In a further preferred embodiment, the system can be used in conjunction with a method wherein a plurality of separate entities each control a separate portion of space within an automated retail store, in conjunction with the automated store receiving goods in master cartons from separate delivery agents.

In this embodiment, agents may be separate from the delivery agents of the other of the plurality of entities, and the master cartons containing the goods are received into the housing of the automated store through a secure portal and then opened automatically and then stored into a portion or percentage of the storage area which is allocated either in advance to the various entities, or alternatively on a pay per use basis by the various entities, to the specific one of the separate entities. The entities control the types of the goods which are sent to, moved into and stored in the automated store, and the entities can control the sale price of the goods which they control and the store can retrieve and combine a plurality of different articles from a plurality of master containers wherein the combining of articles includes the combining of articles from stored containers which are from different ones of the separate entities.

And furthermore in another embodiment, the separate entities control their portion of the space allotted to them through an internet communications link. In one embodiment the separate entities can control how the merchandise is displayed and the content of the electronic presentation of their merchandise. In a further embodiment the entities control changes in pricing or incentives for their merchandise. In a further embodiment, the merchandise stored in the automated store is owned by the controlling entity until the time that it is sold to a customer.

In a further embodiment the separate entities pay a management fee to the owner and or operator of the automated store. In a further embodiment, the separate entities pay a rental fee for the space that they control within the automated store. In a further embodiment, the amount of the fee which a given one entity pays to the operator, manager or owner of the automated store for is at least partially determined by the amount, quantity, profit margin and or total profitability of the sales of the goods of the particular entity. In a further embodiment, the amount of the fee which a given one entity pays to the operator, manager or owner of the automated store for is at least partially determined by the amount of space required for the storage of the goods of the particular entity.

The apparatus and system can be used together with a method including a first party and at least a second wherein the first party uses the second party to deliver goods to an automated store which sells goods and furthermore wherein:

The store has a storage area for storing goods to be sold from the store, and

In one embodiment, the first party has a financial interest in the operations and sales of goods sold from the store, and In one embodiment, the second party is (at least) a deliverer of goods which are to be delivered to the store or determines at least some of the goods which can be delivered and or entered into the store, and The store includes a goods transfer system which operates in conjunction with a secure loading port for enabling the second party to transfer the delivered goods through the secure loading port and into the storage area inside of the store, and In one embodiment, the secure loading port is capable to limit the second party from physically accessing any of the goods which are stored in the storage area of the store, and or from affecting the goods owned by any other entity that are stored within the store and The store having means for determining the identity of the goods being transferred into the store, and The store capable dispensing goods through a delivery port of receiving electronic orders for goods which are located in the store The store having a secure portal for delivering orders of goods to a user of the store and The store being unmanned and In one embodiment, the store is designed to allow the second party to control the transfer of the delivered goods to the inside of the store, while still limiting the second party from accessing any of the goods which are stored in the storage area of the store, and In another embodiment, in response to an order for purchase which is received from a customer, an agent, a website, or a purchasing entity remote to the store, the articles stored inside the housing of the store are delivered to a user of the system through a user portal or delivered to a delivery agent which transports the delivered goods to a remote location and delivers the goods to an end user who ordered the goods remotely.

MODULAR EMBODIMENTS AND OTHER METHODS

Emergency Modules

Another method of using the above apparatus is as an emergency automated distribution system which can be enabled to distribute emergency supplies such as medicine, protective apparatus or other controlled material which is needed in the event of an emergency. An authorization code can be given to the system that will enable it to dispense the emergency goods.

One benefit of the system is that the goods are kept in a very secure housing, so it can be positioned in a location which is in proximity to the population which might be affected by a potential emergency. Another benefit is that the goods can be stored in a manner which is very confidential and wherein only a limited number of people are aware which goods are stored therein. Another benefit of the system is that the goods can be distributed to a local population with a minimal amount of human contact between the distributor of the goods to the system and the people receiving the goods from the system (particularly useful if the people are in a "quarantine-type" situation).

Such a system provides that no, or only a few people are able to touch the material which is stored inside a controlled and remotely monitored environment within the storage area. In the event that a portion of the storage area is needed to be kept sterile, this is also possible.

A network of automated systems of this type can be spread throughout a large geographical area in order to minimize the time it takes to distribute emergency goods on a large scale over a large geographic area. The entire system can also be dropped by an airlift vehicle such as an airplane or helicopter into a geographic area for dealing with a potential or actual natural disaster, or for dealing with emergencies which are created during wartime. In this way, rationing of goods to a local population can be effectively enforced. Note that enforcement is enhanced by the controlled delivery port, which may require ID codes, PIN codes, finger print analysis or even facial recognition in order to ensure controlled delivery of the articles from inside the secure housing to the end users.

Further features of the automated store and fully automated warehouse can include:

Mixing of Goods (order picking articles from master cartons and recombining them into new order cartons)

Where the boxes are input into a totally secure system

Where the boxes are opened automatically

Where the boxes are stored in a storage area

Where a user of the system orders a particular group of articles from a plurality of stored boxes Where the articles are picked automatically using pattern recognition software Where the articles are combined into a common bag (where the articles are combined) and loaded automatically Where the loaded bag goes out of the secure area to a person who receives the combined package Where a plurality of users can purchase goods and enter orders from the system at the same time Where a plurality of orders can be filled at the same time Where a plurality of orders can be presented and delivered to a plurality of users at the same or proximate time As noted above, the automated store and fully automated warehouse can include that the entire apparatus is automated and is enclosed within a secure housing which can include a housing wherein the outside structure of the housing is located outdoors and protects the internal apparatus, and that the space inside the housing is defined as not intended for humans to operate inside for performing any of the functions of the above described apparatus. Accordingly one embodiment of the housing is that it is made of steel, and the automated system may thus be containerized, that is, contained within, for example, a structure such as a cargo container.

Furthermore, wherein the housing does not therefore have to contain any support systems that would normally be required for a building which is inhabited by humans, including for example, toilets, walkways for loading product, lighting systems, fire suppression sprinkler systems, environmental comfort and safety systems, temperature suitable for human operation, HVAC, ventilation, communications systems. Not requiring these systems and also having the module be fire resistant, for example, contained by and made of steel, means that one can build-up such an automated system within, for example, a structure such as a cargo container.

In the embodiment where a structure similar to a cargo container or other type of structural "module" which can be used as the housing for an automated store module or a automated warehouse module, one or more sides of the cargo container can have one or more portals for enabling goods and or shipping containers or boxes to enter into and be transferred out of the module. The openings or portals into the housing of the module can enable a conveyance means such as gantry robots, conveyor belts and or other mechanical systems to facilitate the movement of goods and articles into and out of the module or modules.

Figure 16:
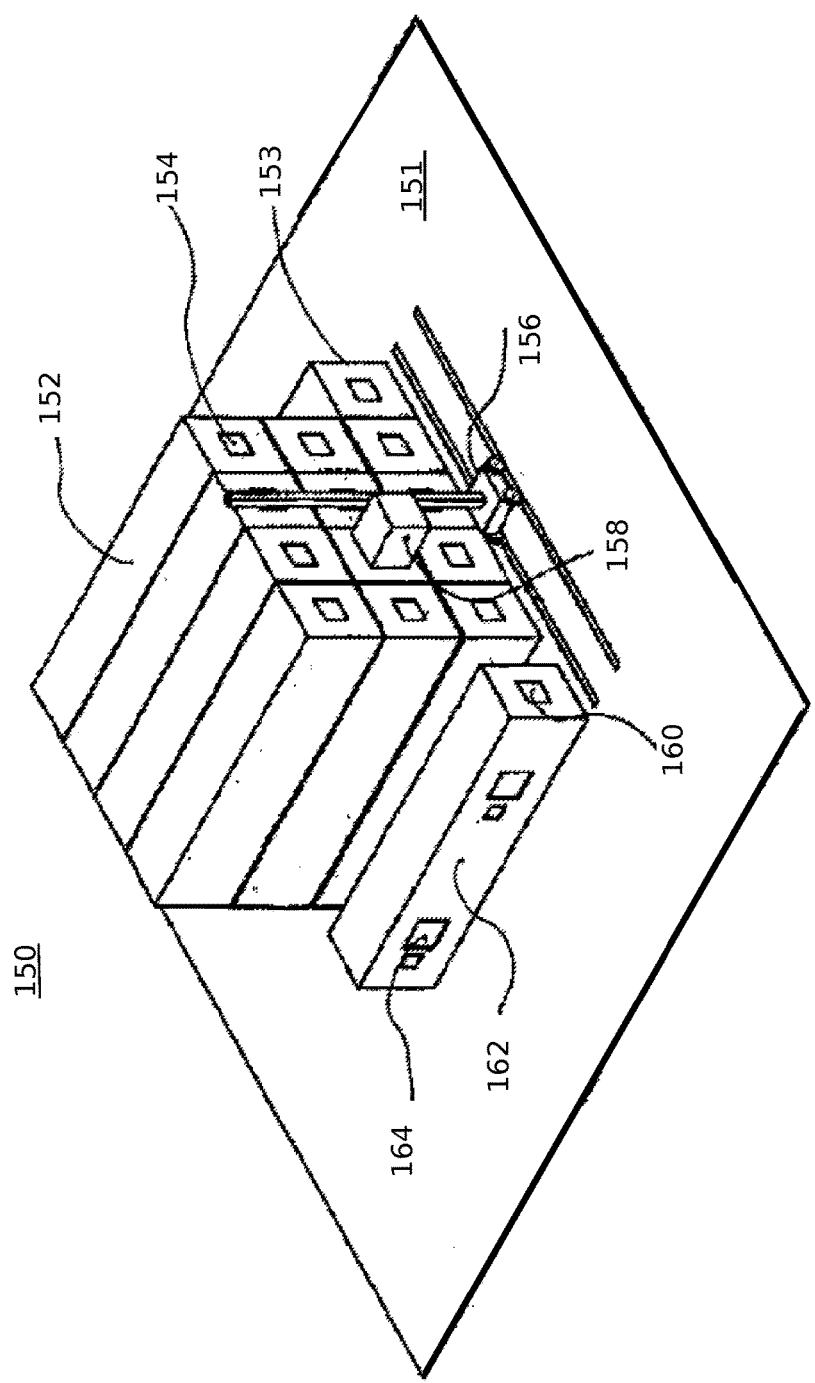
FIG. 16 shows an automated retail store (as used herein, the term automated "store" means an automated "selling" device) or an automated distribution system which is comprised of modular units.

FIG. 16 shows an automated store or distribution system 150 which is comprised of modular units 152 using structures similar to shipping cargo containers which are supported by a concrete or asphalt surface 151. The modules 152 have an opening 154 in at least one end of the module 152 where shipping boxes and or articles can pass through from inside the modules from or to a robot carriage 158. The robot carriage is able to move up and down and left and right in order to be positioned in from of the various modules. Robot structure 156 can move left and right to move the carriage as the carriage can also move up and down on the vertical beam attached to the robot 156. Goods can be moved into or out of carriage 158 and be transported into or out of the modules and or into the user retrieval port module 162 where a user can then retrieve goods. Module 153 can be equipped with an automatically loading security interlock area, used specifically as the entry module for a delivery person to load shipping boxes into the module 153, and thereafter the boxes can be moved by the robot and carriage to the any one of the other modules to store the shipping boxes. Module 153 can also contain a box opening apparatus which can open some or all of the boxes that are entered into the modular system before the boxes are transported to be stored in the various modules. Retrieval user port 164 is a port where the user can retrieve their articles or a user delivery container containing their articles. Port 160 is a port through which the robot can transfer articles or user delivery containers which were retrieved from the storage modules into the retrieval module.

In this embodiment, the housing of the cargo container or other similar structure/module can contain some or all of the key elements and apparatus and means of the automated store or warehouse, and the apparatus within the store, such as its own conveyance devices, can work in conjunction with additional conveyance systems which are able to move goods outside of the module and in between a plurality of modules and also between various modules and a delivery or user port, and or between the modules and a shared shipping carton entry module or apparatus which is coupled to a plurality of modules.

In such a system which includes a plurality of individual modules, each of which have their own housings, and which modules are then coupled together with conveyance apparatus and means (some of which conveyance apparatus may be external to the housings of the modules), the security and protection of goods and apparatus and articles which may be moved on the conveyance systems and not protected by the housings of the modules can be protected by having additional housings which are formed so as to cover and protect the conveyance apparatus which is outside of the housings of the individual modules.

Figure 17:
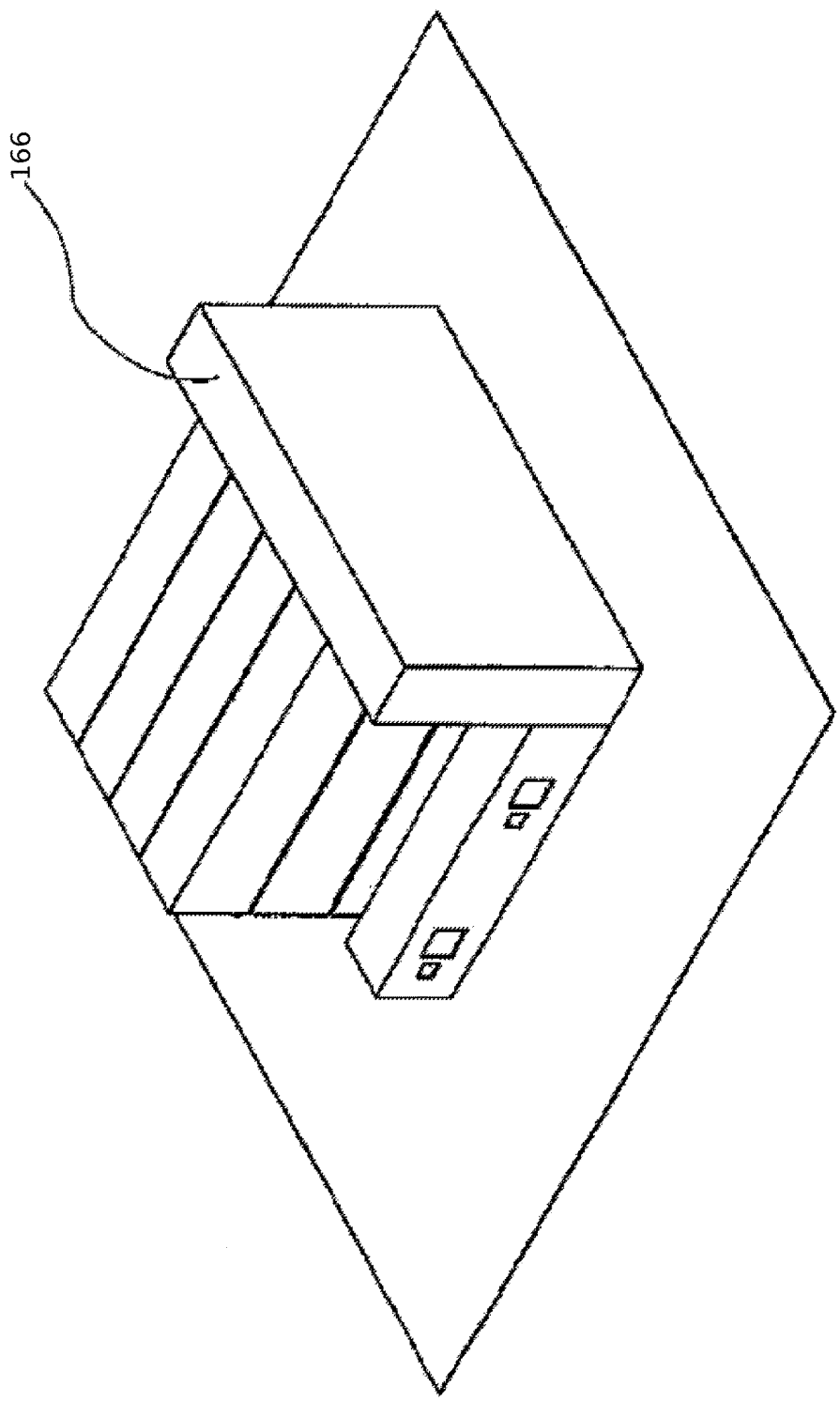
FIG. 17 shows the modular automated system of FIG. 16 with a housing 166 covering the robotic system and conveyance system.

FIG. 17 shows the modular automated system of FIG. 16 with a housing 166 covering the robotic system and conveyance system.

Figure 18:
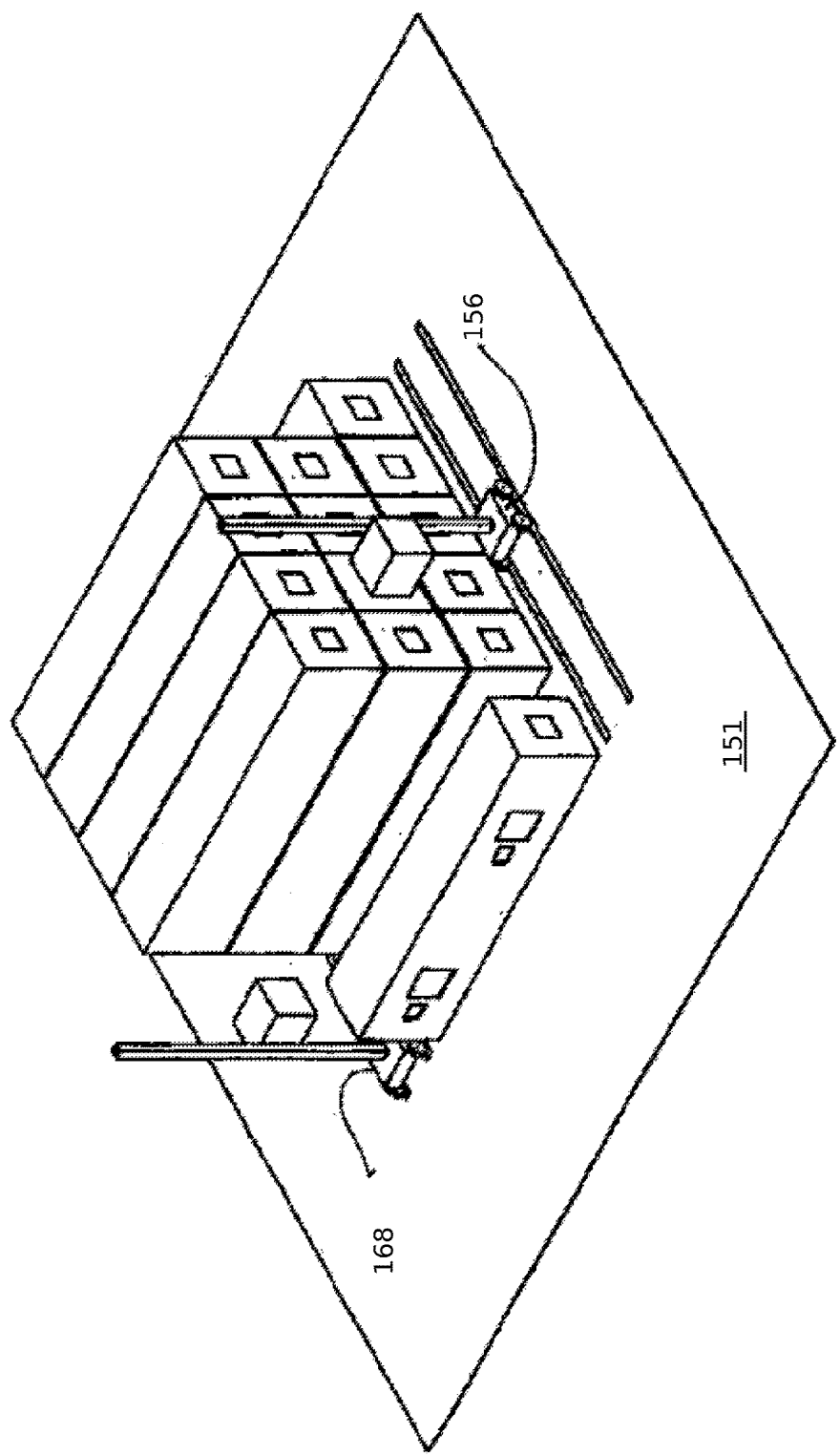
FIG. 18 shows a modular system with multiple robotic transfer systems.

FIG. 18 shows a modular system with multiple robotic transfer systems 156 and 168, which both can be designed to either load and or retrieve boxes, containers, articles and or other goods into or out of the other modules.

Figure 19:
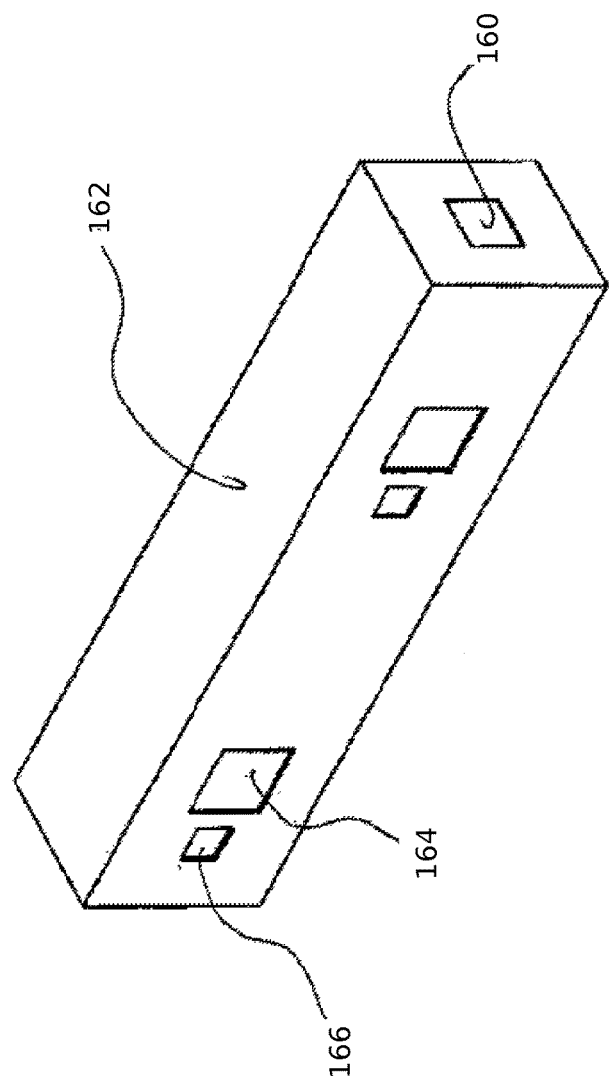
FIG. 19 shows a user port retrieval module

FIG. 19 shows a user port retrieval module 162 which has a plurality of user ports or user portals 164 as well as a plurality of a plurality of user interface video units 166. Portal 160 can be used to transfer user delivery containers into the housing of 162 by the robotic transfer system.

Figure 20:
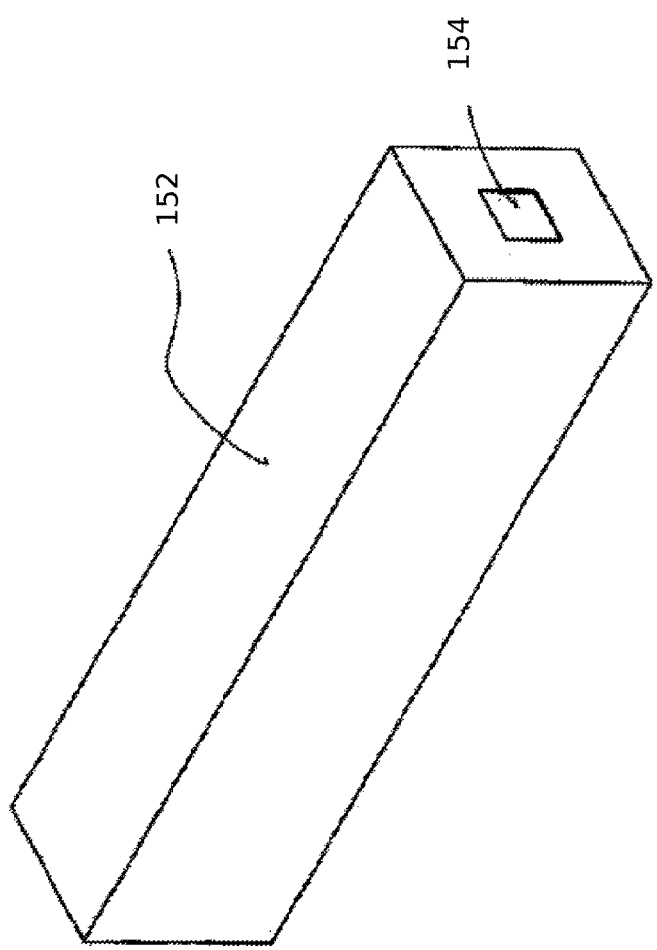
FIG. 20 is shows a view of one embodiment of automated module which includes a transfer port which can be used to transfer shipping containers to and from other modules of the system.

FIG. 20 is shows a view of one embodiment of automated module 152 with a transfer port 154 which can be used to transfer shipping containers such as boxes into or out of the housing of the module 152 and also for transferring user delivery containers and or articles into or out of the module housing 152 through the port 154.

In one embodiment, the modules are made of a fire retardant material such as steel or other metal, or where the modules are constructed of other fireproof material.

In this way, there is no place in the system where a person who is outside the system can access goods, articles or apparatus which is protected by either the housings of the individual modules, or the housings which are designed to protect the conveyance apparatus or means which conveys goods throughout the coupled system. By having the system modular, the manufacturing costs can be significantly reduced, since, for example, the location of the construction effort itself can be remote from the site where the store or warehouse will be situated for operation. One can build the modules anywhere in the world and the cargo container sized sections of the system will fit together at the final site and destination to form a totally complete warehouse or selling operation at any desired location.

In accordance with another aspect of the inventions described herein is a compartmentalized system using a plurality of compartments which are separate and individual automated modules which are coupled together into a system by way of one or more conveyance means for moving the article containers or boxes between and among the various automated modules.

In one embodiment, the use of separate automated modules with their own substantially individual and independent housings which are coupled together in a manner enables shipping containers such as shipping boxes containing goods as well as individual articles to be automatically transferred from a plurality of the compartments or modules to a common user port location which the plurality of compartments are coupled to. Such coupling to the common port is achieved by use of conveyance systems such as a gantry robot, a crane, a conveyor system, an elevator or a combination of such similar devices. Furthermore, the use of separate automated modules with their own substantially individual and independent housings and are coupled together in a manner which enables shipping containers such as shipping boxes containing goods as well as individual articles to be automatically transferred from a shared shipping container entry means such as a secure entry portal which is coupled to the plurality of modules, and which moves the shipping containers to enter into the plurality of the coupled modules. The coupling is achieved by use of conveyance systems such as a gantry robot, a crane, a conveyor system, an elevator or a combination of such similar devices.

In one embodiment, the fire resistance of the construction of the module is such that it is not necessary to have any fire suppression system within the housing of the module.

In another embodiment, a plurality of automated modules which are couple together each have most or all of the same apparatus and or functionality of an automated store or an automated warehouse as described elsewhere in this specification. Such an embodiment of a module would include a secure entry port which would control the automated entry of authorized shipping containers into the housing of the module while limiting the ability of at least a delivery person from gaining access into the housing of the module. Such an embodiment would also include an automated box opening or shipping container opening means, automated conveyance means for moving shipping containers and articles within the housing of the module, a storage apparatus for storing a plurality of shipping containers, a retrieval apparatus for removing articles from the shipping containers, a means for conveying one or a plurality of retrieved articles to a user inside a.

In a particular embodiment the modules have therein all of the same apparatus and or functionality of an automated warehouse as described herein elsewhere in this specification.

In a specific embodiment the modules have therein all of the same apparatus and or functionality of an ASRS, ASDS, or secure housing as described herein elsewhere in this specification.

In any one of the described modules within this specification can be designed as automated modules which are designed to be fire resistant and to act so as to prevent the spread of fire from one module to another module, and alternatively to prevent the spread of fire from anyone of the modules to a place outside the modules.

In a particular embodiment some of the modules have only certain limited functions and apparatus contained within them at any given time during the operation of the system, and other key functions of the system are accomplished in places other than the modules having limited functionality. For example, a given one module can be designed to not have the means for opening a shipping box contained within that given one module, and the given one module may only have the ability to retrieve products from within opened boxes which are being stored inside the given one module but wherein the opened boxes being stored inside the one given module were opened by a box opening means which is located in a place outside of the given one module.

In this situation, the box may be first opened in a first module which has contained a box opening means or shipping container opening means and apparatus contained inside the first module. After being opened by the box opening means within the first module, the opened box may then be transported by a conveyance system to a second module which may be a module of a different type and which does not contain a box opening means or apparatus, such as the given one module as described above. The opened box would then enter into the housing of the second module and can be stored in a storage system within the second module for retrieval at a later time. The second module can then have an article retrieving means and apparatus located therein which can be used to remove articles from within the opened boxes and wherein the removed articles can then be transported either directly to a user of the system via a conveyance means, or alternatively, the articles can be combined with other articles which are retrieved from boxes which were stored in the second module or alternatively can be combined with other articles which were retrieved from within other modules, which other modules are coupled to the first and or second described module.

The articles can be combined into a user delivery container such as a bag or box and be delivered to a user port in response to an order or command placed by a user. The actual combining and placing of the various articles into a shared one user delivery container can occur within a given one module and also can occur at a place outside of the housings of all of the modules and at a location which is coupled to the system, which for example may be located proximate to where the user port is located.

The modules are thereby coupled into a network or system of modules which can act together and be controlled by a shared control system, which can control the actions that occur within some or all of the modules and the can also control and co-ordinate the actions of the coupling system such as the conveyor systems or robotics that move shipping containers, boxes, articles and or combinations of articles into and out the total system.

Thus, in one example, a user who has ordered a plurality of articles which are being stored in a plurality of different automated modules, will actually cause the control system to activate a plurality of retrieving devices, each of which may be located in different modules, to retrieve various separate types of articles from their respective modules and then cause the system to act together to combine the retrieved articles to be moved to the user in separate packages or alternatively in one combined user delivery container.

In another embodiment of a modular system, a plurality of independent modules can be coupled together so that a plurality of the modules, each one with its own independent housing entry/exit port and structure which housing serves to protect and separate the goods stored inside from the elements of nature outside, are coupled together by conveyance means as well as by having each of their respective external housings attached to one another housing, and wherein the plurality of the modules each has an independent housing which does not allow people access to the apparatus or to the goods which are stored inside the housing, and furthermore wherein a first one of the modules has a secure entry means for receiving shipping boxes which have been delivered to the system from a delivery person who is located outside the system which entry means also includes an automated authorization system for verifying that shipping boxes which have been delivered are in fact authorized to be moved and enter into the first module.

A second module in the system can be designed for only allowing shipping boxes to enter into the housing of the second module after the shipping boxes were first entered into the system through the entry means of the first module and wherein the goods are then transferred and conveyed from the first module to the second module by an automatic conveyance means.

An automatic box opening apparatus for creating an article retrieval opening in the shipping boxes can be located in the only the first module, or alternatively or additionally the box opening means can be located in a separate module which contains an automatic box opening means.

Automatic storing of the opened shipping boxes can be located in one or a plurality of the coupled modules and in one embodiment, the storage and or retrieval apparatus and means can be permanently located inside one or a plurality of the modules, or alternatively, some of the modules may just contain primarily storage areas wherein a portion of the storage and retrieval device, such as a robot which moves the boxes into or out of a storage shelving system and wherein the retrieval device such as a robot which performs this storage and retrieval function, is able to move into and out of one of a plurality of storage modules, and thereby one storage and retrieval robot can be used to service multiple storage modules.

In the embodiment where one robot can be utilized in a plurality of separate modules, the robot can, for example, be operative to retrieve articles from opened boxes being stored inside the housings of various modules, or alternatively, the same robot can be used to bring one or more boxes into one or a plurality of modules in order to transport the boxes to various storage locations located inside the housings of various modules.

The function of delivering one article or a plurality of articles within a user delivery container to a user of the system can be done by having a user portal where the articles exit the system to a user of the system, and there can be a plurality of user portals which can be either located in modules which are only used to function as a plurality of user portals adjacent one another, or alternatively, a plurality of modules with other functions or no other functions can have one or more user portals for delivering articles or goods to a plurality of users.

The automatic conveyance means for moving the user delivery container to an exit port of the housing or used for moving shipping containers into or out of various modules can include a gantry style robot which can access a portal in a plurality of the modules of the system. This conveyance apparatus will move articles or shipping containers or boxes from any one of the modules to any other one of the modules. This can be used to bring articles from one module together with the articles retrieved from other modules and finally on to delivering the combined or separate articles towards a user port. The user port will enable goods or articles to transfer from within the protected system of coupled modules and related conveyance means to a user which is located outside the system. Each of the entry ports or entry means or user ports or delivery ports can prevent at least the end user and or a delivery person from entering into the housing and which furthermore prevents people from directly accessing the inside of the housings of the modules and the goods which are stored inside the housing.

If anyone wants to get goods out of the system, the system is designed to have them use the automated means for retrieving the items and transferring them to the user port. The system of an automated modular store, warehouse or selling device described herein can also include one or more order entry systems and apparatus such as a touch-screen, a keypad, a video monitor and or a link to the internet for remote ordering from another remote location, wherein in all the various systems mentioned can include the ability to display goods which are being offered for sale through the store onto a video screen for viewing and ordering by a user. Various forms of payment systems can be included all of which are known including credit card, cash, bills, coins, debit cards and RFID systems.

In another embodiment, a modular store or warehouse is provided, where the modules have robots inside them and they deliver the goods to an external robot which is located outside the module and wherein the external robot(s) can retrieve products from a plurality of modules, and wherein the external and internal robots operate in conjunction and coordinated with one another in order to achieve an integrated system. An order placed for goods from a plurality of the modules can be delivered to a common one delivery port, and can furthermore be placed into a common package which contains goods which were stored in a plurality of storage modules.

The storage and retrieval modules are each self contained so that if a fire occurs in one module it could not easily spread to any other module or to a place outside the module.

As noted above, the modules can be stacked up on top of each other, and/or be placed adjacent one another. The modules can have isles inside the housings for robots to retrieve articles and wherein the isles utilize the minimum space required to successfully operate the robot and retrieve the articles being store therein. The modules do not utilize significant utility costs in the form of temperature control or electric lighting which is typical for a manned building. The modules do not require a toilet for any people, and do not require any plumbing or water source to bring water into the structure of the module. The modules can operate in total or near total darkness, and the operation of the module is secure to eliminate the potential of pilferage by people. The modules can be loaded in fully automated and secure manner, so as to prevent a goods delivery or loading person from stealing (pilfering) goods from inside the store. Images of the actions of the delivery person and the operations of the loading of goods into the secure loading port can be captured by a security camera, and the delivery person may be required to input a code into the system before the secure loading port will allow the goods to be transferred through the port. A set of data (in the form of a bill of lading in paper, or in electronic form) concerning information relating to the goods being delivered can be communicated to the computer control system of the apparatus by the delivery person, and data concerning the goods being delivered are accepted by the control system. Once the control system has determined the data received from the delivery person is valid, the control system can allow the secure loading port to be enabled so as to allow the loading person to transfer the goods into the secure structure.

While the features described in the above paragraph can be used in conjunction with a modular store or warehouse, many of the features are also able to be incorporated into an automated system having a single housing as described elsewhere in this specification.

It is noted that one embodiment of the system described herein could be a vending machine, with the ability to have automated restocking of goods which are to be sold inside the vending machine. Such system can include a method and apparatus for filling and refilling (restocking) a vending machine, wherein reduction of labor, reduction of pilferage, reducing costs are some of the goals. Such advantages increase the rate at which an entity can grow their business by minimizing the constraints of geography/route density, and reducing the fixed cost investment required to add another truck and leveraging existing distribution infrastructure, which is scalable in small increments, so that increased distribution costs for setting up a new location can be done without regard for geography or route density, and added fixed costs of a dedicated route.

In one embodiment, a first automated store or module or automated warehouse system such as is described can receive delivered master cartons and open them and pick items to create either a) smaller case packs or b) variety packs of similar or dissimilar product types; to then be repacked and output to an automated delivery portal for pickup by a transportation or trucking service and then to be picked up by a transportation service and delivered to a second fully automated store or automated vending machine such as the type described in this specification, which second store can automatically open the shipping containers containing the articles of mixed types and then can store the shipping carton and retrieve the articles contained therein as needed to fill orders and can use a vision system to help determine which goods to grasp within the box since there are articles of different types within the same store box or shipping container. This is of particular use when trying to reduce the required inventory at a given automated store while still providing for a full range of articles to store and or sell. This use of have two fully automated distribution facilities used in conjunction with one another can create high efficiencies which are not practical to achieve with the current use of manual labor in either or both of the facilities of current or conventional design In order to facilitate someone obtaining goods from the system, the system is designed to have such persons use the automated means for retrieving the items and transferring them to the user port.

APPENDIX-
copy of my prior PCT application PCT/US2007/010757

AUTOMATED STORE FOR SELLING ARTICLES

*Field of the Invention*
[0003] The present invention relates generally to an automated store for selling articles, and more particularly in one embodiment, to a system for automatically receiving, opening and storing shipping containers and retrieving articles from the shipping containers..

[0004] *Brief Description of the Drawings*
Figure 1 illustrates one embodiment of an automated store in accordance with the invention.

[0005] Figure 2 illustrates a typical shipping container of the type to be received and stored in the store of Figure 1.

[0006] Figures 3-5 illustrate various openings formed in various shipping containers.

[0007] Figure 6 illustrates one embodiment of the store of Figure 1, having a housing 60, including an input port, including a sensor/scanner/ID device 62 for sensing or scanning or otherwise identifying shipping containers, an interlock area 64, a container storage area 66, an output area 68 and a container conveyor system 70 located between input 64 and an output interlock area 68. A customer interface 72 is also shown, including a touch screen 74 and article selection and payment interface devices 76.

[0008] Figure 7 illustrates a more detailed view of the input port and customer interface of the store of Figure 6.

[0009] Figure 8 illustrates a view of the interior of the housing at the input end, where the shipping containers pass through a secure portal/interlock area 80, where an opening is formed in the shipping containers by a robotic box opening mechanism 82, where the opened shipping containers are conveyed with the assistance of an article retrieval device 84 to a storage area 86, and finally showing a user container 88 which contains articles which were ordered by a user, being moved by a further conveyor 89 toward an output of the housing 4.

[0010] Figure 9 illustrates one embodiment of an article retrieval device 84 for the invention, which uses a first robotic device 90 for positioning the opened containers 29 into and out of the storage area 86, and a second robotic device 92 for retrieving articles from inside the opened containers by using the openings as shown in Figures 3, 4 and 5.

[0011] Figure 10 shows one embodiment of a conveyor system for use in the housing of Figure 1, having a first conveyor 102 for transporting the authorized containers into the interior of the housing 60, a second conveyor 104 for transporting the containers to the opening means, as well as to the storage means 86, and a third conveyor 106 for transporting the selected articles and containers through the interlock area 68 to an output port leading to the exterior of the housing. Note internal and external doors 108 and 110, respectively, for the interlock areas.

*Detailed Description of the Invention*

[0012] Figure 1 shows one embodiment of a system which is an automated store 2 for storing and selling articles. The automated store having a housing 4 for receiving closed shipping containers (29 of Figure 2) into the housing for storage, and for distributing articles 32 of Figure 3, to an output 20 of the housing which articles 32 were retrieved from inside stored shipping container 29.

[0013] In one embodiment, a store including an entry means 8 (secure portal/interlock area 80 of Fig 8) for controlling entry into the housing 4 of a plurality of closed shipping containers 29, with at least some of the plurality of closed shipping containers having outer dimensions which are different from the outer dimensions of other ones of the plurality of closed shipping containers.

[0014] The embodiment shown in Figure 1 also shows a sensing means 10 for determining the position of at least a portion of an outside surface of each one of the plurality of closed shipping containers that have entered into the housing.

[0015] The embodiment of Figure 1 shows an automated forming means 12 (and 82 of Fig 8) for using the determined position which is specific to each of the closed shipping containers to form an opening in each of the plurality of the shipping containers.

[0016] The embodiment of Figure 1 shows a storing means 14 (and 86 of Fig 8) for storing the plurality of opened shipping containers inside a storage area of the housing.

[0017] The embodiment of Figure 1 furthermore shows a computer controlled retrieving means 16 (and 84 of Fig 8 and 90, 92 of Fig 9) for entering into selected ones of the opened shipping containers located in the storage area, by passing through the formed opening so as to retrieve an article from inside one of the stored opened shipping containers; and

[0018] The embodiment of Figure 1 furthermore shows moving means 18 (and 88 of Fig 8 and 106 of Fig 10) for moving the retrieved articles to an output 20 of the housing. Element 6 represents the delivery of the shipping containers to the housing 4, element 22 illustrates the controller for the elements within housing 4 and element 24 is a user/customer interface for making selections and payments for obtaining articles from the store.

[0019] Figured 6 and 7 show further details of the automated store described in Figure 1, further including a customer interface 72 which allows a customer of said automated store to select a desired one or more of the articles stored therein. The customer interface can also allow a customer of said automated store to make a payment for the one or more of the selected desired articles. An Internet connected communication device for allowing the customer to access said automated store via the Internet , a touch-screen 74 or other selection and/or payment device 76 located at the site of the automated store can also be included in the system. The housing described herein can also include means for providing a secure environment for the shipping containers and the other recited means herein which operate the automated store. The entry means can include an authorizing means for authorizing the entry into the automated store of only authorized shipping containers. Furthermore, the authorizing means can include means for authorizing a delivery person, which delivery person, once authorized, is deemed to supply authorized shipping containers to said entry means. The authorizing means can include the means to communicate with a database in order to confirm that specific shipping containers were anticipated and pre-authorized for entry into the housing. The authorizing means can be enabled to communicate in real time to a remote location and/or to a remotely located person and/or computer. The authorizing means includes a shipping container identification (ID) device for determining the identity of a shipping container. The shipping container ID device can access a database in order to determine one or more of what articles are contained in the shipping container and how those articles are arranged in the shipping container, based on its determined identity.

[0020] If the shipping container is determined to be not authorized, entry into the store is not granted and prevented.

[0021] The shipping container ID device can further cooperate with a manipulation device for manipulating the shipping container in order to enhance the ability of the shipping container ID device to determine the identity of the shipping container. The manipulation device can include one or more of, a gripper mechanism, a robot, or any device that can rotate the shipping container. The shipping container ID device can include a camera imaging system. The camera imaging system can use image or pattern recognition techniques to identify the shipping container and also can recognize and identify the articles located inside the opened shipping container. The camera imaging system can include a color image sensor for sensing attributes of the shipping containers, which attributes are then and compared with information that is stored on a database, either a local or remote location, so as to identify the shipping container. The camera system or other sensor type system can be utilized by the computer control system to enable the guiding of the manipulation device or the article retrieval device. This database can contain information which is specific to a given shipping container and or a specific article or package which information can be utilized by the system in conjunction with information generated by the sensors or camera system in order to facilitate the guidance of the retrieval apparatus and or the manipulation apparatus. This same database can also be utilized and / or integrated with the database which is used in determining the whether a container or package is authorized to be in the store. Alternatively, the shipping container ID device may comprise using one or more of a Barcode Recognition system, an RFID system, a Text reading system, an optical scanner, each of the foregoing systems able to be operable with or without the use of the forenoted camera imaging system.

[0022] The housing can be one of a fixed structure, such as a stand-alone housing, a building, or a portable structure, such as a trailer. The housing can also be adapted to be located at a position that is one of above ground or underground. The housing includes a secure input system which permits only authorized entry of containers or people to places within the housing. The secure input system includes an interlock area having an exterior door for preventing entry into the interlock area. The opening of said exterior door can be enabled to open when the authorizing means has authorized the entry into the automated store. The authorized opening of the exterior door can also be enabled by utilizing a physical lock and key or other similar type of device.

[0023] The interlock area can be adapted to receive, and then automatically pass therethrough, without human interventions, only authorized shipping containers. The interlock area can be an area bounded by the exterior door and an internal door, where passage of authorized containers past the internal door can only occur after said exterior door has been closed and a sensor has determined that only authorized persons or shipping containers are in the interlock area.

[0024] The system can include a conveyance system for moving shipping containers that enter into the housing to places further within the housing.

[0025] The forming means can operate so as to form said opening in said shipping container at a location and with a dimension that is specific to the identified typed of each of the plurality of shipping containers, so as to thereby ensure that said computer controlled retrieving means can enter the opened shipping container by passing through the formed opening. The system can determine where to create an opening location into the box based on information (stored, for example in a computer memory) on specific parameters of the box , including, for example, based on the physical layout of the articles inside the container. The forming means forms said opening by removing from the shipping container a side thereof, removing a portion of the outside surface of said shipping container, by removing tape which is sealing the opening and thereby unsealing and lifting up flaps of said container, and then alternatively on other embodiments, physically separating said flaps from said container or securing said flaps to exterior side of said container, for example using tape to tape the flaps to the sides of the box in the opened position, in a manner so as to form said opening in said container. The system can further include a disposing device for disposing of material removed from said shipping containers to make said opening.

[0026] The automated store can have storing means also to store therein received shipping containers which have not been opened, so that said not opened shipping containers can be delivered to the output of the housing. The automated store can also deliver to a user a combination of articles which were retrieved from opened shipping containers as well as delivering unopened shipping containers to the user.

[0027] The store has storing means for storing containers, which storing means can include a plurality of storage areas for receiving for storage therein said shipping containers. The storage areas can include an arrangement of one or more bins or racks. The storage means can store the opened or closed shipping containers in a position which is best suited for the article retrieving device to retrieve articles from the container, or to just retrieve the unopened container. This may include storing opened shipping containers with the opening facing upward or towards the retrieval mechanism or in another direction which is suitable to the successful retrieval of the articles inside the shipping containers. This can include racks that are situated to squarely present the containers to the retrieval apparatus, or to present them at an angle, or with the opening facing upward, or with opening frontward so as to be facing towards the retrieval apparatus, or stored in a position which keeps track of the location of the inside layout or positions of the articles based on the database information relating to that specific type of container type and / or article type stored in that container type. The shipping container can be stored in a specific position and with a specific orientation so that, for example, not only is the opening facing a certain direction while it is positioned in the storage location, but the container may be also positioned so that specific sides of the container may be facing in a certain direction, so that the system can determine where to place the retrieval apparatus in order to be able to grip to one of the packages.

[0028] The system can further include a shipping container positioning system (e.g., conveyor) for moving said opened shipping containers into said storage areas.

[0029] The article retrieving device can include a robotic article grasping device, which uses a vision system, and / or pattern recognition to guide the retrieval apparatus for retrieving said articles from said shipping containers. The robotic article grasping device may use vacuum sensing for determining when said article retrieving device has grasped an article. The article retrieving device can include one or more of a robotic device, gantries, and grippers of different sizes and shapes, and methods, for example, the grippers can be of the type with use one of more of suction cups or electro-mechanical gripping devices for grasping articles from the shipping containers.

[0030] In one embodiment of the invention, an enclosed and secure structure or housing which can limit people from gaining access into the housing, and more particularly from gaining access to any of the articles or containers located inside the housing, includes a loading port for receiving a plurality of closed shipping containers, the plurality of shipping containers can include a variety of differently shaped or differently dimensioned shipping containers which contain articles therein and/or articles to be transported into the housing , a security authorization means for ensuring that only authorized shipping containers are allowed to either enter into the housing or additionally or alternatively to be stored in the system, a shipping container detection means that enables the system to detect the position and / or location of at least a portion of the outside surface of the shipping containers which have been loaded into the housing, an opening means for forming an opening in the shipping containers , a conveyance means for conveying the opened shipping containers to storage locations for storing at least some of the shipping containers, a retrieval means for retrieving articles, and / or packages containing articles, from inside the shipping containers, a conveyance means for allowing containers and/or articles to be transported from within shipping containers located inside the housing to a user of the system who is outside of the housing and the user of the system can access and remove the articles being distributed from the system. In addition, the system can have a user interface such as a touch-screen video system, typically located outside of the secure housing, in order for the user to communicate with the system and for inputting data such as order selections into the system. Additionally, the system can utilize computer controlled sensors and other technology including electromechanical sensors, pattern and or image recognition hardware and / or software in order to identify a specific shipping container, a specific article or package type, and or the location and orientation of a specific shipping container or the location and orientation of a specific article or package which is located inside a shipping container The system has a computer control means for controlling some or all of the various apparatus within the system including some or all of the apparatus described herein.

[0031] In other embodiments, the system can also include the ability to retrieve one of a plurality of articles from inside various shipping containers which are stored inside the housing and move the plurality of articles into a single user container which is supplied from within the housing and can include containers such as a paper bag, a plastic bag or a cardboard box.

[0032] It is noted that it is not required that the loading port or user access port be structures that are separate from the housing, and in some embodiments of the invention, the loading and user access ports can utilize the same or different structures as the housing. It is also noted that the loading or user access port can be formed using a separate structure which is connected to the housing. The port may include conveyance apparatus which can include conveyor belts, elevator systems, pneumatic tube structures that are connected to or part of the housing. Additionally, in another embodiment, the port can be a secure door through which containers or packages are placed or retrieved manually.

ARTICLE HANDLING
[0033] In accordance with the invention, the housing includes apparatus for providing automatic handling of articles to be located therein.

[0034] One type of such automatic handling apparatus includes a conveyance apparatus for transporting a plurality of containers into the housing via the loading port and a conveyance apparatus for transporting the containers (or articles that were located inside the container), via the user access port, to a user of the housing who is located outside of the housing. These conveyance apparatuses can be totally separate from one another, or can comprise a combined or even the same apparatus. . It is noted that in some instances, the term shipping container could mean various types of containing devices or packaging, such as a boxes, cartons, bags, tubes, etc. Such containers can have one article or item stored or contained within them and/or can have a plurality of items stored within them. In most embodiments, the shipping containers being received by and or loaded into the system are of a wide variety in size and or shape and or material thicknesses and may be made of various types of materials such as cardboard corrugated material or for example paperboard or other types of packaging materials.

[0035] In accordance with an aspect of the invention, the Automated Store for Storing and Selling Articles (ASSSA) includes a container identification (ID) system which can identify a container being presented to the housing and which can then enable a control system of the ASSSA to determine *whether the container is authorized to be conveyed into the housing* or into the storage area within the housing. This determination by the control system can be based on many factors, such as whether the control system was anticipating that specific type of container or even the specific unique package at that time. Additionally, the determination to allow the container into the housing can be based on whether the control system determines that there is sufficient space in the housing to store the container. The ID system can include a bar code scanner, an RFID device, a camera, an optical sensor, mechanical sensors or other sensors.

[0036] The housing may also include an apparatus for automatically creating an opening in a portion of a container which may include the removal of a portion of a container in a manner so as to not damage the articles located therein, the opening created in the container being of sufficient dimension and location in the container so that articles located in the container may be removed from the container. Alternatively, the container may never be opened by the opening apparatus, and transported to the second storage location in an intact and unopened state.

[0037] It is noted that various types of known systems can be used for manipulating the container, and/or the cutting instruments for creating the opening in the container, such as rotating and/or stationary blades, laser beam cutters, etc. Such cutting devices are know in the industry, see for example US patent 6,863,486.

[0038] A conveyance apparatus is used for bringing the container to a storage location in the housing, which storage location can include a shelf, rack or bin. The conveyance apparatus may include a traditional type of conveyor belt or chain driven transport system (powered by a device such as a motor, a hydraulic or pneumatic system, a screw feed, a rack and pinion, or a piston mechanism or some other mechanical device),.and may or may not be used in conjunction with further article handling mechanisms, such as a gantry robot, a multi axis articulated arm robot, or some other mechanically based article handling system.

[0039] This conveyance to the storage location can be done before or after any opening is made in the container.

[0040] It is noted that once the opening in a container is provided, an article retrieving device located in the housing can access the opening for removing the articles from inside the container, thereby enabling the articles to be transported to a second location. Such transportation of the article to the second location can be done by the article retrieving device, or can be done in combination with a further conveyance apparatus.

[0041] In one embodiment the removal of an article from a container can be accomplished using a gripper. The gripper can include a vacuum based suction cup or mechanical claw type gripper or other material handling mechanism, all of which are commonly know in the art. In order to facilitate the proper retrieval of items from the container, a robotic device utilizing optical, vision, vacuum or other sensors can be used.

[0042] It is noted that in a preferred embodiment, a disposal apparatus is provided for securing to the material, if any, which may have been removed from the container to form the opening, so as to transport any such material to a disposal or recycling area. Such securing apparatus can include a mechanical or suction-type gripper, a robotic arm, or some other material handling device. A portion of the apparatus that removes a portion of the container and creates or forms the opening, can also form part of the apparatus used to remove and dispose of that material removed to form the opening.

[0043] It is also noted that the housing could have multiple storage locations therein so as to accommodate a plurality of containers of similar or different shape and/or size. Each container may have similar or different items or articles inside them. A container could have only one item contained inside, while another container could have a plurality of items or articles contained inside.

[0044] It is noted that the article retrieving device which removed the article from the container, could be all or part of the conveyance apparatus that puts the article in the second storage location. Alternatively, the article can be moved with a separate conveying apparatus to the second location.

[0045] In accordance with another aspect of the invention, the second location can be or have co-located therewith, a further container, such as a non-returnable bag or box, that is delivered to an end user. Such further container is hereinafter called a delivery container. In one embodiment, the delivery container can move with the article retrieving device so as to be positioned to directly receive one or a plurality of articles from the article retrieving device, which articles were removed from one or a plurality of containers. Once the article is in the delivery container, the system can dispense that container with one or a plurality of items requested by the user, to be conveyed out of the user access port of the housing and to the end user end user (or a package delivery service). Alternatively, the delivery container can be held for an indeterminate period of time in order to receive additional items and/or to be held for a few hours, days, or more for later pick-up by end user (or a package delivery service). Thus, the delivery container receives the items requested by the end user. In the event that the items requested are unopened containers, then it is possible that no delivery container would be used.

[0046] Additionally, it is noted that further automatic container handling means could be used inside the secure housing, such as an automatic "de-palletizer" as well as an automatic "palletizer" for removing containers from pallets or placing containers on pallets, respectively.

[0047] The delivery container may be of the type which is preformed before being located in the housing, or it may be of the type which is formed within the housing, such forming can be accomplished using any one of known carton or bag forming devices, and the carton or bag can be formed so as to have handles to assist the user or a delivery service for the transportation and/or movement of the container to the end user..

[0048] In another embodiment of the invention, there is no delivery container, and the stored articles are delivered directly and individually to the user waiting at the user access port , via the conveyance apparatus without the use of a bag or carton.

[0049] In a preferred embodiment of this aspect of the invention, the system can seal the delivery container, using for example an adhesive tape. Additionally, automatic means can be provided so as to be printed or otherwise affixed to the container addressee/user information so that the delivery container is ready to be received by a package delivery service for delivery to the end user.

[0050] It is noted that the housing of the ASSSA can comprise various sections, each section having, for example, a different environmental condition, such as a different temperature or humidity. Such conditions can be attained by the use of air-conditioning or other refrigeration system located in, on, or near the housing, thereby enabling at least a portion of the inside of the housing to be kept air conditioned, refrigerated, frozen and/or in an ambient environmental condition.

[0051] In accordance with a further aspect of the invention, a payment mechanism is associated or otherwise included with the automated storage and distribution system, thereby configuring it as an Automated Selling Device. For example, when the system and structure comprises a retail store for the storage and sale of goods, there are several ways a user of the store can access the payment system, such as by:
    i) using an internet/online based access,
    ii) using an order entry interface device which is located outside the housing, but in proximity thereto, such as a touch screen, bar code scanner and menu/list system, or other input device, to enable users to request one or more of the articles in the store, or
    iii)     using a user supplied device when the user is in close proximity to the store, such as a PDA or a cell phone.

[0052] Additionally, a variety of end user payment systems may be used in conjunction with the automated selling device for enabling the end user to pay for the articles delivered to him. The end user payment can be made by cash, debit, credit or other electronic method, and can be made at the site of the storage system or can be processed via a remote link which can include use of the internet or a cell phone.

[0053] The automated selling device can also be accessed using a security code or other method which methods can include the use of a magnetic card, a biometric device, a PIN number code or other similar system. This will enable a deliver service to deliver or remove articles or packages from the enclosure in a secure manner.

[0054] Thus, the system can also be used as a sales system thereby distributing goods in exchange for payment, or alternatively, it can be used as a secure distribution system which prevents access of stored items from being retrieved unless a person has authorization to do so, such as a delivery service which is retrieving a parcel from the enclosure for further transportation.

[0055] In an even further alternative embodiment, the system can be used as both an automated warehouse for controlling the access of the goods inside for security purposes, and additionally can also allow items to be sold from the system as the need may arise.

[0056] Therefore, it is possible that the very same system can function at any given time as either a secure distribution warehouse and or a retail or wholesale outlet. So for example, a parcel delivery company can use the system as a distribution depot for the transfer of goods from one distribution site to another one or to a final customer where, payments are not necessary for accessing the goods or containers inside. In another scenario, the very same system can be selling items from the housing to other persons who are interested in purchasing goods from the system.

[0057] Additionally, the system can be utilized as a public warehousing or distribution system enabling people to have items stored in the housing and whereby they can retrieve the items or packages at a time of their own choosing.

[0058] The above noted devices can be accessed by the user via a drive-up or walk up window.

[0059] For enhanced services from the store, a user can access a remote site via a remote video and/or audio link to a live person, if the end user at the store needed assistance.

[0060] In accordance with a further aspect of a further preferred embodiment of the invention, the automated storage and distribution system includes an imaging system. The imaging system can be used to identify the orientation of the containers in the housing using sensing mechanisms, such as mechanical sensors, a vision or image or other optical device, as well as a bar code device or radio frequency ID tag device (RFID).

[0061] Such imaging system may cooperate with the robotic or conveyor apparatus, in order to assist with re-orientation of the container in a manner so as to prepare it for storage, or for assisting with the forenoted manipulation so as to ensure the container is properly placed before forming the opening therein.

[0062] The forenoted article retrieval device uses the image system, and additional sensors (such as suction sensor or further image or proximity sensor) to identify where and how to grab or otherwise secure to the articles to be removed from the container. It is also noted that the article retrieval device may, if desired, grab more than one articles when removing them from the container.

[0063] Information relating to metrics of the container dimensions, container contents, opening orientation and instruction set, internal layout of articles within the container or carton, color or shape of the articles or packages inside the container or carton, whether the items contained inside are of a delicate or rugged nature, can all be accessed by the system from a database which can be stored at the site of the housing or can be remotely updated to the system via a remote link, including using the internet, a wireless system or a wired communication connection.

[0064] It is noted that in accordance with a further aspect of a preferred embodiment of the invention, a shipping container which is stored in the housing, once opened, may be used as a storage container for the articles, that is, the shipping container is moved to a storage location with all the articles still positioned inside the container, and then the article retrieval device selectively removes articles from one or more of the stored containers, in order to fill a request for articles from an end user (i.e., customer). In this way, there is no need to have a person manually load the items discretely into a storage area within the housing, since the container in which the items were transported to the distribution system housing, also acts as the storage device from which the individual items may be automatically retrieved by the retrieval device.

[0065] A particular advantage of the present arrangement is that it provides an automatic, i.e., non-human contact, process which allows an end user to obtain individual ones of articles that are shipped in bulk in a sealed container from a manufacturer. That is, the shipping containers received into the housing could have been "sealed" at the factory or warehouse of the manufacturer of the articles, and an end user can obtain one or more of the articles from inside one or more of the various containers stored inside the housing, in a manner that does not involve human contact to the articles.

[0066] As noted above, in another embodiment, the system can distribute and or convey unopened containers as well as items from opened containers to the user access port . This may be desirable since some containers may only have one item inside, or a given user may wish to retrieve or purchase a full carton of a specific item.

[0067] In an even further aspect of a preferred embodiment of the invention, once all the articles have been removed from the shipping container, the disposal apparatus attends to disposal of the container. In one embodiment, the apparatus may convey the empty container to a disposal location with one or more compacting devices that may be located in or attached to the housing.

[0068] In an even further aspect of a preferred embodiment of the invention, metrics regarding the container are, in advance, and either remotely or directly, input to a computer controller of the automatic storage and distribution system, which metrics provide information to the vision and/or opening devices. Once the container and its contents have been identified, specific to attributes of various ones of the containers and the articles positioned therein can be used to determine and or control further handling and transportation of the container and its contents into and around the inside of the system.

[0069] Additional feature of a preferred embodiment can include remote video monitoring of the system which can monitor any part of the process within the housing so that if there is a malfunction, a computer or a person at a remote location can assess the situation and can even remotely take control of the system in order to rectify a given problem.

[0070] Additionally, a person loading containers to the port can be required to input an authorization code through one of various electronic means, including a magnetic card, a PIN number, a fingerprint reader or other method which would enable that person to activate a secure port thereby enabling him to load a container into the housing. Both the loading port and the user access port can be designed to be secure, thereby not allowing any person access into the housing area or the storage area. So, while a person may be authorized to deliver packages or cartons to the housing, that same delivery person has no access to the inside of the housing and he cannot access any containers or packages which are located inside the housing. In this way, the person delivering the containers does not have to be a person who the owner of the distribution system has any prior dealing and there is no need to have any relationship of trust or otherwise in order for the delivery person to facilitate the loading of containers or packages into the housing of the distribution system.

[0071] A particular advantage of the above system and its various embodiments, as compared with prior art storage and distribution systems, or retail stores, is that a significant cost of such prior art systems is due to the labor involved in moving cartons (with or without further articles positioned therein) from the manufacturer to an intermediate storage/distribution facility and then to the location where the user will pick-up the articles (i.e., such as onto the shelf of the retail store). Such shipping, storage and handling costs experienced by the article manufacturer and the store owner/operator are ultimately passed on to the end customer, as reflected in a higher final sale price of the article. On the other hand, the system of the invention allows the storage and distribution system (i.e., a retail store or a warehouse distribution system built according to the present invention) to leverage existing article transportation infrastructure and services, such as the United Parcel Service (UPS) and Federal Express (Fex Ex) or other general trucking and transportation companies, to deliver the containers to the housing of the inventive system. These existing transportation service company's typically provide for article transportation to literally any place on the globe at a highly efficient and competitive price. Thus, by using such service company's for container transportation and loading of a structure in accordance with the present invention, this feature results in a significant savings over an article manufacturer having to distribute his products on his own, thereby requiring a fleet of trucks, drivers and a plurality of centrally located distribution centers as well as all of trustworthy personnel required to stock the shelves and or pick the products.

[0072] The system of the invention also includes automated systems inside the housing which attend to the initial sorting, final storing and then ultimate distribution of the articles to the end user, all without additional costs for employee labor or providing the physical and financial infrastructures needed for employees. Thus, many of the "manpower" and "real estate" costs involved in the operation of a retail store or a distribution warehouse are avoided. Such costs include: the requirement to provide an environment "habitable" to employees, such as sufficient area for them to work and sufficient light, air, heat etc., a place for them to take care of personal needs, such as a bathroom, the provision of vacation time, time off, administrative and management employees to oversee lower level employees, etc. All these costs are avoided, as well as all of the other overhead and indirect costs of employees. Without employees, the size of the store can be limited to not much more than is need to actually store and distribute the articles to be dispensed, and the real estate required to meet such habitability needs of employees is avoided.

[0073] A further advantage relating to the fact that the above handling of the cartons and articles inside the housing is accomplished in a mechanized and automated way, without human intervention, is that:
- the loading of the housing with the cartons can be accomplished by an unskilled person, such as the truck driver/carton delivery person,
- employee and third-party delivery person related issues, such as article and monetary theft, as well as article damage due to mishandling, is avoided.

These advantages result in real cost savings for the automated store owner/operator, and allow for greater profit margins without increasing the cost of the articles being dispensed as compared with traditional stores.

[0074] While the present invention has been disclosed with reference to certain embodiments, numerous modifications, alterations and changes to the described embodiments are possible without departing from the sphere and scope of the present invention, as defined above. Accordingly, it is intended that the present invention not be limited to the described embodiments, but that it has the full scope defined by the above language, as well as equivalents thereof.

[0075] In accordance with the above description, the present invention includes, among other features:
1. an enclosure
2. a port which enables transfer of packages into the enclosure , this port can include a means for controllably blocking access into the housing,
3. a port which enables transfer of packages out of the enclosure, this port can also include a means for controllably blocking access into the housing, and,
4. means for removing a portion of packages in the enclosure so as to make an opening, so articles stored therein can be automatically, and without human contact or intervention, removed from the package.

[0076] In accordance with further aspects of the invention:
- at least one package which has been transferred into the housing though the port includes a plurality of "articles" therein.
- the articles can include a further package that contains more articles.
- the package opening device includes a cutting device, for cutting the package to make the opening.
- Further including an article retrieving device located in the enclosure for removing articles from a package using the opening, and transferring the articles to a further location.
- providing to the user goods that are retrieved from a location in the enclosure upon the users request.
- where the further articles were received into the enclosure in one or more packages which were sealed by the supplier of the articles, and the articles were delivered to the end user at the retrieval of the housing by fully automatic means in the housing, so that the articles are removed from the sealed packages and then delivered to the user all without human contact..

[0077] Furthermore, :
1. the further location may be a predetermined storage location in the enclosure, or
2. the further location may be the user access port .
3. Where the further location may be a "dispensing container" which is provided to the user via the user access port
4. Transfer means are located inside the housing to transfer at least one of the packages from inside the housing to outside the housing through a port,
5. Where an article retrieval device provides the articles to the transfer means from a storage location inside the housing.
6. Where that port can restrict access to the packages which remain inside the enclosure. (I think this is redundant)
8. where the in and out port are the same, or
9. where the in and out port are different.

[0078] In accordance with another embodiment, the present invention includes:
1. an enclosure
2. a port which enables transfer of packages into the enclosure
3. a port which enables transfer of packages out of the enclosure, and 4. Further including a conveyance system for transferring the packages from the portal into the enclosure, the conveyance system including:
    a. Means for identification of the package +/or articles inside the package
    b. Apparatus for analysis of the orientation of the package
    c. Apparatus for manipulation of the package based on the orientation analysis
    d. Apparatus for determination if the package is acceptable to enter the enclosure
        i. where the Determination is based on bar code/input scan of the package,
        ii. where the Determination is based on what the housing was expecting via advance knowledge, such as via a wireless connection

[0079] In another embodiment, the invention comprises:
1. enclosure for storing packages therein, having a loading and user access port
2. a conveyor for transporting packages into the enclosure ,
3. A system for removing a portion of a package after being transported into the enclosure, the portion being removed creating an opening in the package from which individual articles may be removed, and
4. An article retrieving device located in the enclosure for removing articles from the package via the opening and transferring the articles to a further location.
    a. Where the further location is a storage location in the enclosure
    b. Where the further location is the user access port .

[0080] Business methods in accordance with the invention include using the above-noted enclosure and apparatus to make an automated package/article storage and retrieval system which can use the shipping facilities of "common carriers" to "load" the enclosure with the packages and articles to dispensed to the end users.

[0081] This method allows multiple manufactures, each making a different article, to ship their items in bulk to a given enclosure, which enclosure can then "load itself" without human intervention, thereby resulting in significant cost savings in shipping, as well as reduced personnel costs at the enclosure.

[0082] It is noted that one method for forming the opening can be by:

- Cutting the tape or otherwise opening./unsealing the flaps of said container,
- Bending the flaps outward from the container, and then
- physically separating said flaps from said container by moving a blade in an upward direction so as to cut off the flaps from the container at the fold lines they made with the sides of the container, or
- by securing said flaps to exterior sides of said container (for example with tape) in a manner so as to form said opening in said container.

[0083] The Fully automated system can have a sealed housing and require no human intervention to operate, which allows containers having different external dimensions than others of the shipping containers, into the housing, and an opening means can adjust /be adaptable to open shipping containers having various outer dimensions, and having means for adjusting the opening of the shipping container, and using the attribute information for determining the opening dimension. Furthermore, unless a proper authorization code is received by the system, containers presented to the housing are prevented from proceeding to the container opening means inside the housing.

[0084] The following are some of the situations in which the above system can operate:
Where the plurality of packages within a given box are of the same type (identical items)
Where the packages within a given box are of a variety or mixed product types (bags of different flavors, size, type of product)
Where the retrieval device goes into the box to retrieve the packages
Where the plurality of packages are (pre-packed) positioned within the box such that the (possibly without divider walls, possibly random, organized in a pattern such as being organized into rows, columns, stack and or layer.)
Where packages are made from flexible packaging materials, such as a bag or pouch (as opposed to rigid packages, such as bottles, boxes, cans, rigid or semi-rigid containers [such as yogurt or cottage cheese container type])
Where the flexible packages are easily deformable and tend to shift within the box and therefore for the retrieval device to determine the position to pick the product from can be challenging due to the unpredictability of the package location within the box.
Where the packages are positioned in the box in a manner that is at least somewhat disorganized and or stored in a random manner.
Where the retrieval apparatus itself, (or the conveyance systems, or handling) can also cause the packages to become disorganized or less organized than they were originally when they were originally packed (Originally packed means for example how they were packed into the box at the point when the box was shipped from a different distribution point, such as at the factory where the products were produced or at a remote warehouse where they were packed into the carton.

[0085] The system can automatically open shipping cartons, and using the shipping carton as the storage container from which orders can be automatically picked and deal with the tremendous variety and variability of different shipping carton types, shapes and sizes, different package types (bags, boxes, bottles), shapes and sizes, and the tremendous variety of physical orientation of packages within the shipping cartons, different temperature zones these cartons must be stored in.

[0086] In some prior systems, there is a requirement for a person to manually open up the shipping carton and transfer the packages to a dispensing bin. Regardless of the type of product being transferred and regardless as to how the packing arrangement was in the shipping container, the packages then had to be arranged in a specific manner required for the dispensing mechanism to operate properly. So, packages of different types having different sizes and shapes which were originally packed into their original shipping cartons, each different item type having been arranged in a variety of ways and which packages are organized in an organized manner which is the same from item type to item type. This loading pattern (including random pattern or no pattern) is dictated by the dispensing or retrieval mechanism.

[0087] In the present arrangement, the shipping container is generally used as the storage container from which articles are retrieved.

[0088] The system combines intelligent box opening combined with intelligent box manipulation/positional storing which enables the article retrieval device to have the ability to predetermine how and where the retrieval device needs to be manipulated in order to retrieve the articles.

[0089] The system can include a Package ID system for Authorizing Package Input and Moving the loaded box/bag to the customer retrieval area, or sealing the box , or labeling box with shipping information for destination , or storing box in a queue area within or associated with the housing/system, and or an authorized person can present ID to the machine and then can be authorized by the control system to remove the container

DELIVERY TO THE SYSTEM:

[0090] Delivery can be accomplished using a truck with a driver, multiple delivery agents can be used, or a plurality of unrelated trucking or transportation entities each with their own identification codes can be used for delivery of the containers to the automatic store.

[0091] The containers can be offloaded from a truck by hand, by automatic conveyor system, by pallet, with a forklift, etc. The Shipping container can be identified as a specific type of container, or as having a Specific type of article contained therein, or as having identification including bar code markings, graphics, text, symbols, or an RFID tag.

[0092] The shipping container may have been closed or sealed using tape, using glue, using staples. The shipping container can be a box, made of paperboard, cardboard, plastic, corrugated material or some other material. The shipping container can be a formed bag, which can have different sizes and or shapes and can be made from various materials including plastic, or including paper.

[0093] The shipping container can have a plurality of articles therein, where the at least one article can be a package, and where the package can have at least one article contained therein.

[0094] The packages which are stored in the shipping container can be stored in an organized manner such as in rows, columns, layers, whereby some of the packages are occluded by other packages and where a plurality of packages within a specific container are stored with the front facings of the plurality of packages facing in various directions or wherein packages are stored in a manner such that they could shift their position during transport or further wherein where the articles are stored in the shipping container in a random manner.

[0095] The types of articles can be various and can include items such as food, electronics, components, paper goods

[0096] The types of packages can be various as well and can include bottles, cans, bags, cylinders, pouches

[0097] The articles within the shipping container can be identified, as a specific type of article or as being a specific type of package, or as a package having a specific type of article contained therein

[0098] The package can have an identification including bar code markings, graphics, text, symbols, or RFID tag which the various types of sensors and or cameras can detect to identify the packages and their orientation or position within the opened shipping container

[0099] The housing can be one that houses the components and systems of the described automated store, and provides a secure environment for the containers and apparatus related to the system and can be a stand-alone building, or can be a portable trailer, or can be above ground or underground, or be as small or large, or can be housed in a cabinet the size of a room or a large building, can be made of wood, metal, masonry, plastic or other construction materials.

[00100] The Input port opening can be an opening in the housing for allowing packages to enter into the housing, which opening is large enough to allow packages of various sizes and shapes to enter into the housing

[00101] Computer Control System and can be PC, embedded controls, mechanical and or electromechanical relays, at least partially remote, and can have hardware which can be located fully within or proximate to the housing, or Which can be at least partially remote, and or which can communicate with computer systems at remote locations, and which can be linked to a network or communications link, and which can operate a video interface for communicating with users of the system, and which can operate a video and or audio communications link to enable people at the store to communicate with people or computers at a remote site.

[00102] The system has software which has a database which can be local or remote the store, and has ability to monitor inventory levels , and has ability to control all of the apparatus within the system and or housing which can send information over the internet to users, customers, suppliers, maintenance personnel, owners, investors, lenders in the store, and other interested parties and Can be operable to shut down part or all of the systems operations in the event of a malfunction.

[00103] The Delivery Person Interface enables authorization for proceeding with delivery and has the ability to identify (and or validate identity) the Delivery person /entity and the ability to confirm that the specific delivery was anticipated and pre-authorized based on the order database of control system. Also it can have the ability to communicate via email, video conference, video phone, wireless voice etc. and in real time to a remote location and or to a remotely located person and or computer for example, for the purpose of dealing with any issues relating to the delivery A badge, bill of lading, pin code, biometrics, other code etc. may be used to activate the authorization.

[00104] Shipping container identification / ID device can determines what the shipping container is, its contents, its identity and can determine the shipping container contents, type, packed quantity, article size,

[00105] The system may be designed to manipulate the shipping container in order to better sense the shipping container's attributes by utilizing a gripper mechanism, or by using a robot, or by using a device that can rotate the shipping container. It can utilize a camera with image or pattern recognition software, or a Barcode Recognition system, or an RFID system, or a Text reading system, or An optical scanner, or other type of sensor, or a mechanical or electromechanical switch , or light beam, or a color recognition sensor, and by determining attributes of the shipping containers and comparing that information with information that is stored on a database, either a local or remote one it can Feed the ID information to Control system database to determine whether shipping container should be allowed to pass into the system.

[00106] The secure portal can be a secure input which is restricted to allow only authorized entry into the housing In order to gain entry into the housing, a shipping container must move through a first opening, and where entry through the opening is typically prevented by an exterior door (barrier, gate, fencing, bars or other physical security mechanism) which may be located near, adjacent to or indirectly connected to the exterior of the housing and where the authorized opening of the exterior door is enabled by an authorization code, or where, for example, the authorized opening of the exterior door is enabled by utilizing a physical lock and key or other similar type of device etc. Once a package passes through the external opening, the package is situated in an interlocking security holding area. This can utilize two doors that open and close in conjunction with one another so as to prevent unauthorized access into the system by a shipping container or person. Further passage beyond the security holding area is typically blocked by an internal door. The internal door will not open until and unless the exterior door has been closed. This arrangement of at least two doors together with a security holding area is intended to prevent unauthorized entrance of a person, shipping container or other object. Additionally, the system can utilize cameras, motion sensors, infrared sensor and or specialized detection software and or other similar devices for determining that no person is within the security area before the system will enable the interior security door to be opened. Additionally, the system can have cameras monitoring the security area of the system so that a person or computer at a remote site can monitor the activity in the loading area or security area of the system.

[00107] The system has a security area for preventing unauthorized objects or people from gaining entrance into the system. The portal into the system has a security area beyond the portal opening where one or a plurality of shipping containers can be located after the shipping containers are placed onto the conveyance means by a delivery person, and the system can then close the external security door so that a person cannot gain entrance into the system during package loading.

Shipping containers are loaded onto a conveyance system for moving package into the housing shipping containers can be loaded into the system, and or onto a conveyor system , directly into a security holding area, and by placing a container on a surface within the housing, or by a transport device located in the housing which picks up a container and moves transports it for example, by a robot, by a gantry, by a crane or other means. And it can move them by loading one shipping container at a time, or by loading a plurality of containers at a time, or by placing a pallet of shipping containers at the opening to the housing. And the system may be equipped with means for moving shipping containers from a pallet to a point within the housing and towards a container opening means. The system can also be used in conjunction with a de-palletizer.

Container opening device with an automated forming means for using the determined position specific to each of the closed shipping containers to form an opening in each of the plurality of the shipping containers, which formed opening may include cutting the container material, cutting the tape, opening the flaps, and or cutting off the flaps. The opening is positioned and dimensioned in a manner that is specific to the identified typed of each of the plurality of shipping containers for allowing automated retrieval of articles from inside of the opened shipping containers, ie. where they are stored in rows, columns, removing from front, top side etc., so for example it can be leaving a certain amount of lip not cut off so as to act as a retainer or cut the box in some other place or manner.

The system can use a disposing device for disposing of the material removed from the containers to make opening, and can even recycle the removed material.

[00108] An retrieval apparatus for retrieving articles from opened boxes for order picking, using robots, vision systems, where the retrieval apparatus uses vision systems and pattern recognition to guide the retrieval apparatus to do the picking of requested articles form the containers, where the retrieval apparatus uses vacuum sensing for determining when it has secured to a package. The retrieval apparatus can be robotic, and can include gantries, grippers, different sizes and shapes of suction cups, electro-mechanical grippers, etc..

[00109] The system can cooperate with user selection system, for retrieving selected articles and with an article packaging system inside the store which can cooperate with a user selection system, for generating a User Package having the user selected articles contained therein.

One of the advantages of the system is that various delivery personnel, such as a plurality of parcel services, trucking companies etc. that do not have to have any particular relationship of trust with the facility can "load" the system. In other words, the concept where an automated system such as a vending system or automated retail, which traditionally requires a trusted agent or employee to go and gain access to prior systems in order to load new articles into the system and where these employees are dedicated specifically to loading the automated machines , and their trucks and warehouses and logistical systems are all specifically dedicated to dealing with and loading the prior machines, and since these people, trucks and equipment are all dedicated only to managing the equipment, ,and a key requirement of the specific retail or vending operator having dedicated resources, for example, people and trucks to service and load the systems, is that the operator must have employees whom he can have significant trust in and a formal business relationship with (since he needs to rely upon the dedicated loading person to load carefully and properly, load items in the correct place be honest and not to steal from the system when the loading person to the operator or owner of the automated retail or vending system), it is not possible to fully benefit from the economies of scale that would occur if the system was rather able to be loaded automatically and leverage the existing efficient general transportation industry. By having the box opening and loading into the system being fully automated, the owner or operator of the system does not need to have a trusted person "load" the machine since the only requirement is to have the boxes be delivered to the system and placed on the conveyor system. One of the many great advantages to this system is therefore to enable an operator or owner to utilize common carriers or general and non-dedicated transportation companies to deliver the boxes since there is no longer a need to have a trusted person open boxes, or load articles into the system.

[00110] Most prior systems in automated stores and or automated vending systems utilize dispensing devices or retrieval apparatus that are designed to dispense or retrieve articles from highly organized rows or columns which are specific in nature to the given system and which are intended to be loaded in a particular way so as to enable the particular dispensing or retrieval mechanism to properly dispense or retrieve the articles. Due to this requirement of prior systems, a person must manually remove the articles from their original shipping containers and manually load them into the bins, compartments or other storage systems of the particular vending or automated store system.

[00111] Therefore, except for situations where articles which are packed into special shipping container which are specifically designed to fit into a specific type of retrieval or dispensing system, most shipping containers are not suitable to be simply put into an automatic apparatus and retrieved from a typical vending or automated store system.

1. An automated store for storing and then distributing articles, the automated store having a housing for receiving closed shipping containers into the housing for storage, and for distributing articles to an output of the housing, which articles were retrieved from inside stored shipping containers, comprising:

an entry means for controlling entry into the housing of a plurality of closed shipping containers, with at least some of the plurality of closed shipping containers having outer dimensions which are different from the outer dimensions of other ones of the plurality of closed shipping containers;

a sensing means for determining the position of at least a portion of an outside surface of each one of the plurality of closed shipping containers that have entered into the housing;

an automated forming means for using the determined position specific to each of the closed shipping containers to form an opening in each of the plurality of the shipping containers;

a storing means for storing the plurality of opened shipping containers inside a storage area of the housing;

a computer controlled retrieving means for entering into selected ones of the opened shipping containers located in the storage area, by passing through the formed opening so as to retrieve an article from inside one of the stored opened shipping containers; and moving means for moving the retrieved articles to an output of the housing.

2. The automated store of paragraph 1 or 48, further including a customer interface which allows a customer of said automated store to select a desired one or more of the articles stored therein.

3. The automated store of paragraph 2, further including a customer interface which allows a customer of said automated store to make a payment for the one or more of the selected desired articles.

4. The automated store of paragraph 2 or 3, wherein said customer interface includes one or more of an Internet connected communication device for allowing the customer to access said automated store via the Internet, a touch-screen or other selection and/or payment device located at the site of the automated store.

5. The automated store of paragraphs 1-4, where said housing includes means for providing a secure environment for the shipping containers and the above-recited means which operate the automated store.

6. The automated store of paragraphs 1-5 and 46, where the entry means includes authorizing means for authorizing the entry into the automated store of only authorized shipping containers.

7. The automated store of paragraph 6, where the authorizing means includes means for authorizing a delivery person, which delivery person, once authorized, is deemed to supply authorized shipping containers to said entry means.

8. The automated store of paragraph 6, where the authorizing means communicates with a database in order to confirm that specific shipping containers were anticipated and pre-authorized for entry into the housing.

9. The automated store of paragraph 6, where the authorizing means communicates in real time to a remote location and/or to a remotely located person and/or computer.

10. The automated store of paragraph 6, where the authorizing means includes a shipping container identification (ID) device for determining the identity of a type for the shipping container.

11. The automated store of paragraph 10, where the shipping container ID) device can access a database in order to determine one or more of what articles are contained in the shipping container and how those articles are arranged n the shipping container, based on its determined identity.

12. The automated store of paragraph 10, where the shipping container ID) device cooperates with a manipulation device for manipulating the shipping container in order enhance the ability of the shipping container ID) device to determine the identity of the shipping container.

13. The automated store of paragraph 12, where the manipulation device includes one or more of, a gripper mechanism, a robot, a device that can rotate the shipping container.

14. The automated store of paragraph 10, where the shipping container ID device includes a camera imaging system.

15. The automated store of paragraph 14, where the camera imaging system uses image or pattern recognition techniques to identify the shipping container.

16. The automated store of paragraph 15, where the camera imaging system includes a color image sensor for sensing attributes of the shipping containers, which attributes are then compared with information that is stored on a database, either a local or remote location, so as to identify the shipping container.

17. The automated store of paragraph 10, where the shipping container ID device using one or more of a Barcode Recognition system, an RFID system, a Text reading system, an optical scanner.

18. The automated store of paragraphs 1, 46 and 48, where said housing is one of a fixed structure, such as a stand-alone building, or a portable structure, such as a trailer.

19. The automated store of paragraphs 18, where said housing is adapted to be located at a position that is one of above ground or underground.

20. The automated store of paragraph 6 and 46, where said housing includes a secure input system which permits only authorized entry to places within the housing.

21. The automated store of paragraph 20, where said secure input system includes an interlock area having an exterior door for preventing entry into the interlock area from locations exterior of the housing.

22. The automated store of paragraph 21, where opening of said exterior door is enabled when the authorizing means has authorized the entry into the automated store.

23. The automated store of paragraph 22, where the authorized opening of the exterior door is enabled by utilizing a physical lock and key or other similar type of device.

24. The automated store of paragraph 21, where said interlock area is adapted to receive, and then automatically pass therethrough, without human interventions, only authorized shipping containers.

25. The automated store of paragraph 21, where said interlock area is an area bounded by said exterior door and an internal door, where passage of authorized containers past the internal door can only occur after said exterior door has been closed and a sensor has determined that only authorized persons or shipping containers are in the interlock area.

26. The automated store of paragraph 5, further including a conveyance system for moving shipping containers that enter into the housing to places further within the housing.

27. The automated store of paragraph 11, where said forming means operates so as to form said opening in said shipping container at a location and with a dimension that is specific to the identified typed of each of the plurality of shipping containers, so as to thereby ensure that said computer controlled retrieving means can enter the opened shipping container by passing through the formed opening.

28. The automated store of paragraph 27, where said forming means forms said opening by one or more of the following techniques:
    i. removing from said shipping container one or more sides thereof,
    ii. removing a portion of the outside surface of said shipping container,
    iii. by opening./unsealing flaps of said container, and then physically separating said flaps from said container or securing said flaps to exterior sides of said container in a manner so as to form said opening in said container.

29. The automated store of paragraph 28, further including a disposing device for disposing of material removed from said shipping containers to make said opening.

30. The automated store of paragraph 1, 46 and 48, wherein said storing means also stores therein received shipping containers which have not been opened, so that said not opened shipping containers can be delivered to the output of the housing.

31. The automated store of paragraph 1, 46 and 48, wherein said storing means includes a plurality of storage areas for receiving for storage therein said shipping container, said storage areas including an arrangement of one or more bins or racks.

32. The automated store of paragraph 31, further including a shipping container positioning system for moving said opened shipping containers into said storage areas.

33. The automated store of paragraph 1 , 46 and 48, wherein said article retrieving device includes a robotic article grasping device, which uses a vision system and pattern recognition to guide the retrieval apparatus for retrieving said articles from said shipping containers.

34. The automated store of paragraph 1 , 46 and 48, wherein said article retrieving device includes a robotic article grasping device, which uses vacuum sensing for determining when said article retrieving device has grasped an article.

35. The automated store of paragraph 1 , 46 and 48, wherein said article retrieving device includes one or more of a robotic device, gantries, and grippers of different sizes and shapes.

36. The automated store of paragraph 35, wherein said said grippers can be of the type which use one of more of suction cups or electro-mechanical gripping devices.

37. The automated store of paragraph 2, 46 and 48, wherein said article retrieving device cooperates with said customer interface so as to retrieve the customer selected article from the storage area.

38. The automated store of paragraph 10, 46 and 48, where said forming means accesses a database having information therein which allows the forming means to determine how to form said opening in the shipping container, which opening is positioned and dimensioned in a manner that is specific to an identified type for each of the plurality of shipping containers.

39. The automated store of paragraph 38, where said database information allows said forming means to form said opening based on specific parameters of the identified type of the shipping container.

40. The automated store of paragraph 31, where the storing means includes racks that are situated so as to present the shipping containers to the article retrieving device at an angle so that the opening faces one of either upward or frontward with respect to the expected direction from which said article retrieving device will approach said stored shipping containers.

41. The automated store of paragraph 1, where the storing means includes a memory device having database information stored therein, said storing means determining the location of where to store said opened shipping containers based on database information which specific to the identified type of each of the shipping containers.

42. The automated store of paragraph 1, further including a packaging system which cooperates with said customer interface so as to receive the desired articles retrieved from the stored shipping containers, and generate therefrom a customer package having the customer selected articles therein, said customer package being moved by said moving means to said output of the housing.

43. The automated store of paragraph 2, 42, 46 and 48, further including an article identification system for identifying articles moved by said moving means to said output of the housing, so as to confirm delivery of the customer of the selected article or articles.

44. The automated store of paragraph 5, 46 and 48, where said output of the housing includes an interlock area having an exterior door for preventing entry into the interlock area from locations exterior of the housing.

45. The automated store of paragraph 1, further including a system controller for enabling all of the operations performed by each of the entry means sensing means, to be controlled in a fully automatic manner and without any human intervention.

46. An automated store for storing and selling articles, the automated store having a housing for receiving a plurality of different types of closed shipping containers into the housing for storage, each of the closed shipping containers having a plurality of articles contained therein, and for distributing said articles to an output of the housing articles which were retrieved from inside stored shipping containers, CHARACTERISED BY:
   a sensing means for determining the position of at least a portion of an outside surface of each one of the plurality of closed shipping containers that have been received into the housing; and
   a computer controlled forming means which uses the determined position specific to each of the closed shipping containers to form an opening in each of the plurality of the shipping containers, which formed opening is positioned and dimensioned in a manner so as to allow automated retrieval of articles from inside of the opened shipping containers.

47. The automated store of paragraph 1, where said sensing means includes a shipping container identification (ID) device for determining the identity of a type for a plurality of the received the shipping containers., said container type indicating specific attributes for the container, which attributes relate to the size of the container and/or the articles and their arrangement as contained in the container, and
   said computer controlled forming means forms said openings at positions and with dimensions that are specific to the identified type of each of the plurality of shipping containers.

48. A fully secured automated store for storing and selling articles, the automated store having a housing which is sealed and operated by computer control so that no people are required to be inside of the housing for receiving closed shipping containers into the housing for storage, and for distributing articles to an output of the housing, which articles were retrieved from inside of stored ones of the shipping containers, comprising:

a computer controlled secure entry means for receiving a plurality of closed shipping containers at an entry point thereof, said entry means controlling entry into the housing of so that only closed shipping containers which are authorized are passed into the housing, where at least some of the plurality of closed shipping containers which are entered into the housing have outer dimensions which are different from the outer dimensions of other ones of the plurality of closed shipping containers which are entered into the housing;

an automated forming means for forming an opening in a plurality of the shipping containers which entered into the housing;

a storing means for storing the plurality of opened shipping containers inside a storage area of the housing;

a computer controlled retrieving means for entering into selected ones of the opened shipping containers located in the storage area, by passing through the formed opening so as to retrieve an article from inside one of the stored opened shipping containers; and moving means for moving the retrieved articles to an output of the housing.

49. A method of operating an automated store for storing and selling articles, the automated store having a housing for receiving closed shipping containers into the housing for storage, and for distributing articles to an output of the housing, which articles were retrieved from shipping containers stored inside the housing, comprising the following steps:

controlling entry into the housing of a plurality of various different types of closed shipping containers, with at least some of the plurality of closed shipping containers having outer dimensions which are different from the outer dimensions of other ones of the plurality of closed shipping containers;

developing information which identifies at least one of the position and type of a plurality of the closed shipping containers;

using the developed position and type information to form an opening in the container, which opening is positioned and dimensioned for allowing automated retrieval of articles from inside of the container;

storing the container inside the housing; and retrieving selected articles from said stored containers, and distributing them to an output of the housing.

50. The method of paragraph 48, wherein said above-names steps are performed in the order in which they are mentioned..

51. The method of paragraph 48, including the further step of allowing a customer of said automated store to select a desired one or more of the articles stored therein by using a customer interface.

52. The method of paragraph 48, including the further step of allowing a customer of said automated store to make a payment for the one or more of the selected desired articles by using a customer interface.

53. The method of paragraph 50 and 51, including the further step of allowing the customer to access said automated store via the Internet, a touch-screen or other selection and/or payment device located at the site of the automated store.

54. The method of paragraph 48, including the further step of authorizing the entry into the automated store of only authorized shipping containers.

55. The method of paragraph 53, where said authorizing step includes determining the identity of a type for a plurality of the shipping containers.

56. The method of paragraph 54, where said authorizing step accesses a database in order to determine one or more of what articles are contained in the shipping container and how those articles are arranged n the shipping container, based on the determined identity of the shipping containers.

57. The method of paragraph 54, where said authorizing step includes means for manipulating the shipping containers in order enhance the ability of the authorizing step to determine the identity of the shipping containers.

58. The method of paragraph 54, where said forming step operates so as to form said opening in said shipping container at a location and with a dimension that is specific to the identified typed of each of the plurality of shipping containers, so as to thereby ensure that said computer controlled retrieving means can enter the opened shipping container by passing through the formed opening.

59. The method of paragraph 54, where said forming step forms said opening by one or more of the following techniques:
    i. removing from said shipping container one or more sides thereof,
    ii. removing a portion of the outside surface of said shipping container,
    iii. by opening./unsealing flaps of said container, and then physically separating said flaps from said container or securing said flaps to exterior sides of said container in a manner so as to form said opening in said container.

END OF APPENDIX

The invention claimed is:

1. A modular automated retail store for storing, selling and distributing articles, the modular automated retail store including multiple housings, each operated by computer control so that no people are required to be inside of the housings for either of receiving closed shipping containers into one or more of the housing for storage, or for selling and distributing articles to a customer at an output of one or more of the housings, which articles were retrieved from inside of stored ones of the received shipping containers, said modular retail store comprising:

a plurality of modules which are required to be connected one to another so as to collectively form a secure environment for said modular automated retail store, said connected modules including the following means located therein:

a secure entry means controlled by a computer for selectively receiving into the housing a plurality of closed shipping containers at an entry point thereof, said shipping containers being in the form of cardboard boxes, said secure entry means being controlled by said computer so that automatically and without human manipulation only closed shipping containers which are authorized for entry into the housing, are passed from said entry point into the housing, said entry means including a physical barrier controlled by said computer so as to automatically prevent people from entering into a storage area of the housing where said shipping containers are stored, and an automated forming means for automatically and without human manipulation forming an opening in a plurality of the shipping containers which have been entered into the housing;

an automated storing means for automatically and without human manipulation moving the plurality of opened shipping containers to storage areas located in at least two of said modules;

a customer interface for allowing a customer of said automated retail store to select a desired one or more of the articles stored therein, and to make a payment for said selected one or more articles;

a computer controlled retrieving means for automatically and without human manipulation entering into selected ones of the opened shipping containers located in the storage area, which said retrieving means passes through the formed opening in selected ones of the shipping containers so as to retrieve said customer selected articles from inside selected ones of the stored opened shipping containers;

a secure output means controlled by a computer so that automatically and without human manipulation only retrieved articles are passed from inside said storage area to an output of the housing where said customer can obtain said selected one or more articles, said output means including a physical barrier controlled by said computer so as to automatically prevent people from entering from said output into said storage area of the housing where said shipping containers are stored; and a computer controlled moving means for automatically and without human manipulation moving the retrieved articles to said output of the housing, and wherein when said customer selects two articles from the retail store, at least one article is retrieved from one of the modules and a second article is retrieved from a second module, and said computer controlled moving means transports the at least two articles to a single output port where the customer can retrieve both of the articles.

2. The secure automated retail store of claim 1, where any entry or output means located in either of said modules includes an interlock area, so that each module is independently secured from unauthorized entry from outside of the housing.

3. The secure automated retail store of claim 1, wherein each of said plurality of modules includes a storage area therein.

4. The secure automated retail store of claim 1, where said plurality of modules share a common secure entry means which is located in only one of said modules.

5. The secure automated retail store of claim 1, where said plurality of modules share a common secure output means which is located in only one of said modules.

6. The secure automated retail store of claim 1, where said plurality of modules share a common customer interface which is located in only one of said modules.

7. The secure automated retail store of claim 1, where said plurality of modules share a common automated forming means which is located in only one of said modules.

8. The secure automated retail store of claim 1, where said plurality of modules share a common computer controlled article retrieving means which is located in only one of said modules.

9. The secure automated retail store of claim 1, where said plurality of modules share a common computer controlled article retrieving means which moves from one of said modules to another in order to retrieve the articles selected by the customer.

10. A method of operating an automated article selling device comprising:

providing a housing which separates an uncontrolled area which exists outside of the housing from a computer controlled area which exists inside the housing, which controlled area is fully automated in it's functional operation as an article storage and selling device without the requirement of human presence inside of the controlled area;

providing an automated computer controlled shipping box entry means which allows controlled movement of only authorized ones of delivered shipping containers having articles to be sold therein, to enter into the controlled area inside of the housing;

providing an automatic computer controlled box opening means located in the controlled area inside of the housing for creating an article retrieving opening in a plurality of the shipping containers;

moving said articles to a storage area portion of said controlled area inside of the housing;

providing a computer controlled exit port for the housing;

providing a computer controlled article retrieval system which, in response to a user of the automatic selling device placing an order for purchase of articles stored in the selling device, retrieves at least one article from the storage area, which articles are then automatically placed into a user delivery container and automatically moved to the exit port, where said user can take control of the user delivery container; and making an agreement that establishes rules between a plurality of separate entities, which rules provide that each entity has limited control over the movement of shipping containers into the storage area of the housing, the computer controller of said automated computer controlled shipping box entry means being programmed to control said entry means in accordance with terms in said agreement.

11. The method of claim 10, where said computer controller of said automated computer controlled shipping box entry means is programmed in accordance with the rules of the agreement between the entities, so that each entity can authorize entry in to the housing of the automated article selling device of a given amount of articles.

12. The method of claim 11, where said given amount is one of a predetermined amount of:
   value of sales transactions to customer,
   of the storage area inside the housing,
   of a given type of an article.

13. The method of claim 10, where one entity is an owner of the automated article selling device, and another of the entities is a supplier of articles to be sold by the automated article selling device.

\* \* \* \* \*